US010726310B2

(12) United States Patent
Gramenos et al.

(10) Patent No.: US 10,726,310 B2
(45) Date of Patent: Jul. 28, 2020

(54) DEPLOYMENT ZONE DEFINITION AND ASSOCIATED RESTRAINT CONTROL

(71) Applicant: VENOEER US INC., Southfield, MI (US)

(72) Inventors: James N. Gramenos, Bloomfield Hills, MI (US); Thomas Herbert, Ogden, UT (US)

(73) Assignee: VEONEER US INC., Southfield, MI (US)

( * ) Notice: Subject to any disclaimer, the term of this patent is extended or adjusted under 35 U.S.C. 154(b) by 0 days.

(21) Appl. No.: 15/942,463

(22) Filed: Mar. 31, 2018

(65) Prior Publication Data

US 2019/0303729 A1      Oct. 3, 2019

(51) Int. Cl.
*G06K 9/62* (2006.01)
*B60R 21/16* (2006.01)
*G06K 9/00* (2006.01)

(52) U.S. Cl.
CPC ............ *G06K 9/6288* (2013.01); *B60R 21/16* (2013.01); *G06K 9/00832* (2013.01); *G06K 9/00838* (2013.01)

(58) Field of Classification Search
None
See application file for complete search history.

(56) References Cited

U.S. PATENT DOCUMENTS

| | | | |
|---|---|---|---|
| 9,096,150 B2 | 8/2015 | Cuddihy et al. | |
| 9,227,531 B2 | 1/2016 | Cuddihy et al. | |
| 9,266,487 B2 | 2/2016 | Engelman et al. | |
| 2002/0082756 A1* | 6/2002 | Breed | G01S 15/04 701/45 |
| 2006/0052924 A1 | 3/2006 | Prakah-Asante et al. | 701/45 |
| 2006/0056657 A1* | 3/2006 | Hooper | B60N 2/002 382/104 |
| 2011/0295469 A1* | 12/2011 | Rafii | E05F 15/43 701/49 |
| 2013/0337762 A1* | 12/2013 | Buch | H04M 3/42 455/404.1 |
| 2016/0086391 A1* | 3/2016 | Ricci | G07C 5/008 701/29.3 |

FOREIGN PATENT DOCUMENTS

EP          0734909 A2     2/1996    ............ B60R 21/00

* cited by examiner

*Primary Examiner* — Jiangeng Sun
(74) *Attorney, Agent, or Firm* — Christopher P. Maiorana, PC

(57) ABSTRACT

An apparatus includes a first sensor, a second sensor and a control unit. The first sensor may be configured to perform a vision detection of an interior of a vehicle. The second sensor may be configured to perform a physical detection of the interior of the vehicle. The control unit may comprise an interface configured to receive the vision detection and the physical detection. The control unit may be configured to perform sensor fusion based on the vision detection and the physical detection, generate a mapping of the interior of the vehicle based on the sensor fusion, (c) compare the mapping with event information and (d) determine an arrangement of corrective measures in response to the comparison of the mapping and the event information. The mapping may classify objects, occupants and critical features within the interior of the vehicle.

20 Claims, 16 Drawing Sheets

DEPLOYMENT ZONE DEFINITION AND ASSOCIATED RESTRAINT CONTROL

FIELD OF THE INVENTION

The invention relates to vehicle generally and, more particularly, to a method and/or apparatus for implementing deployment zone definition and associated restraint control.

BACKGROUND

Advancements in assisted and autonomous driving and car-sharing strategies allow increased spatial-mobility within the vehicle cabin. In terms of where and how the vehicle occupants and objects can be located and positioned, various configurations may be available in future vehicles. Currently, very little information is known about occupant location.

With New Car Assessment Program (NCAP) evaluations and star ratings the position of the occupant is known and set up specifically for the test scenario. However, occupants can be larger, smaller, out of position and in various other possible locations when responses by the vehicle such as air bags are activated.

Conventional vehicle sensor systems may not include inputs, processing, and control necessary to determine characteristics of the occupants to account for increased spatial-mobility. Vehicle sensors and actuators will need to be implemented with flexibility and adaptability to account for increased spatial-mobility.

It would be desirable to implement deployment zone definition and associated restraint control.

SUMMARY

The invention concerns an apparatus comprising a first sensor, a second sensor and a control unit. The first sensor may be configured to perform a vision detection of an interior of a vehicle. The second sensor may be configured to perform a physical detection of the interior of the vehicle. The control unit may comprise an interface configured to receive the vision detection and the physical detection. The control unit may be configured to perform sensor fusion based on the vision detection and the physical detection, generate a mapping of the interior of the vehicle based on the sensor fusion, (c) compare the mapping with event information and (d) determine an arrangement of corrective measures in response to the comparison of the mapping and the event information. The mapping may classify objects, occupants and critical features within the interior of the vehicle.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include implementing deployment zone definition and associated restraint control that may (i) receive data from non-physical sensors, (ii) distinguish between free-space and occupied spaced in a vehicle cabin, (iii) sense physical attributes of objects, (iv) perform sensor fusion using various types of sensor data, (v) classify and identify objects, (vi) map an interior of a vehicle and/or (vii) be implemented as one or more integrated circuits.

Embodiments of the present invention may utilize additional sensor inputs, along with traditional sensor inputs and/or emerging corrective measure technology (e.g., occupant protection control systems) outputs. The additional inputs may enhance decision-making capabilities. The enhanced decision-making capabilities may improve an effectiveness of corrective measures. In one example, more accurate and precise awareness of occupant seating/configuration may enable the deployment of corrective measures to be adapted to a specific scenario. As spatial-mobility and/or seating orientation in vehicles is modified (e.g., including modifications on-the-fly as the vehicle is in motion), the corrective measures may modify default deployment settings to ensure a response commensurate with the orientation and/or characteristics of the occupants. In some embodiments, vehicles may measure and/or account for some occupant/seating characteristics, such as seat installation state (e.g., installed/not installed), seat belt state (e.g., belted/unbelted), seat occupant presence (e.g., occupied/unoccupied) and/or seat longitudinal position (e.g., forward/not forward). Embodiments of the present invention may combine the occupant/seating characteristics with additional sensor input and/or sensor fusion based on multiple vehicle sensor systems.

Figure 1:
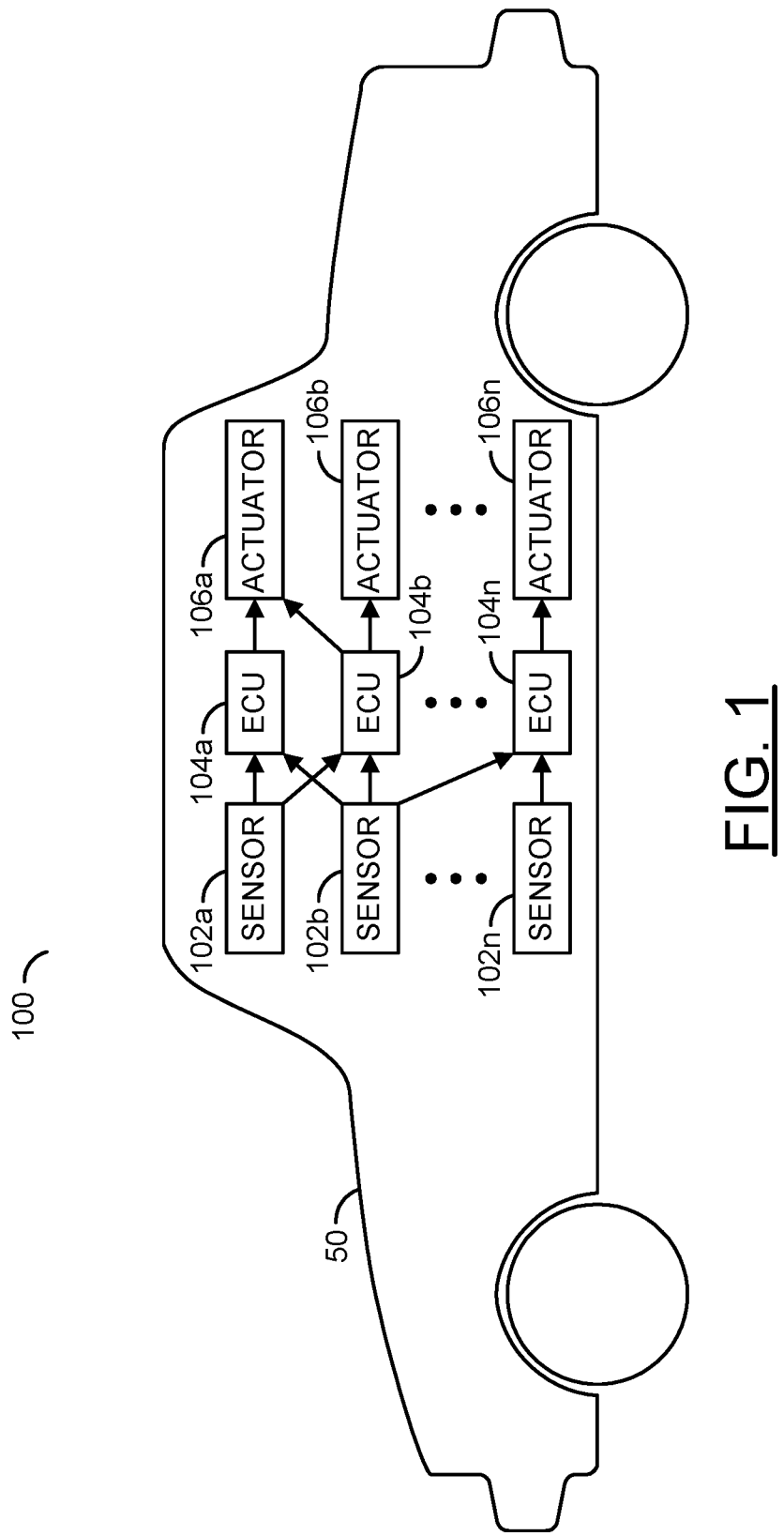
FIG. 1 is a diagram illustrating a context of the present invention.

Referring to FIG. 1, a diagram illustrating a context of the apparatus 100 is shown in accordance with an embodiment of the invention. The apparatus 100 is shown in the context of a vehicle 50. In one example, the vehicle 50 may be a commuter vehicle such as a car, van, truck, sports-utility vehicle, a sedan, etc. In another example, the vehicle 50 may be a commercial transport truck, an emergency vehicle (e.g., fire truck, ambulance), an airplane, etc. The vehicle 50 may implement an internal combustion engine, an electrical vehicle, a hybrid vehicle, an autonomous vehicle, a semi-autonomous vehicle, etc. The type of the vehicle 50 that the apparatus 100 is implemented in may be varied according to the design criteria of a particular implementation.

The apparatus 100 may comprise a number of blocks (or circuits) 102a-102n, a number of blocks (or circuits) 104a-104n and/or a number of blocks (or circuits) 106a-106n. The circuits 102a-102n may implement sensors. The circuits 104a-104n may implement control units (e.g., electronic control units). The circuits 106a-106n may implement actuators. For example, one or more of the actuators 106a-106n may be used to implement corrective measures. The apparatus 100 may comprise other components (not shown). The number, type and/or arrangement of the components of the apparatus 100 may be varied according to the design criteria of a particular implementation.

The sensors 102a-102n may be configured to detect, read, sense, and/or receive input. In some embodiments, each of the sensors 102a-102n may be configured to detect a different type of input. In some embodiments, each of the sensors 102a-102n may be the same type of sensor. In one example, the sensors 102a-102n may comprise video cameras (e.g., capable of recording video and/or audio). In another example, the sensors 102a-102n may comprise infrared (IR) sensors (e.g., capable of detecting various wavelengths of light). In some embodiments, the sensors 102a-102n may comprise vehicle sensors (e.g., speed sensors, vibration sensors, triaxial sensors, magnetometers, temperature sensors, gyroscopes, LIDAR, radar, accelerometers, inertial sensors, kinematic sensors, etc.). For example, the sensors 102a-102n may be configured to detect acceleration in an X direction (e.g., aX), acceleration in a Y direction (e.g., aY), acceleration in a Z direction (e.g., aZ), a yaw, a pitch and/or and roll. The implementation, type and/or arrangement of the sensors 102a-102n may be varied according to the design criteria of a particular implementation.

In some embodiments, one or more of the sensors 102a-102n may be configured to implement a radar system using terahertz waves. The terahertz waves may comprise electromagnetic waves operating within frequencies ranging from approximately 0.3 THz to 3 THz. For example, the terahertz waves may have wavelengths of approximately 1 mm to 0.1 mm. Terahertz waves may be transmitted through materials and/or be used to determine material characterization. Radar systems implementing terahertz waves may enable a mapping of an interior cabin of the vehicle 50. For example, terahertz waves may be implemented to analyze and/or map the interior of the vehicle 50 faster than using cameras and/or video analysis. In some embodiments, mapping using terahertz waves may be performed within milliseconds.

The sensors 102a-102n may be configured to capture information from the environment surrounding the vehicle 50 and/or information from the interior of the vehicle 50. In some embodiments, the sensors 102a-102n may implement satellite sensors (e.g., sensors implemented around a periphery of the vehicle 50). In some embodiments, the sensors 102a-102n may implement remote sensing units (RSUs).

The sensors 102a-102n may be vehicle sensors (e.g., speedometer, fluid sensors, temperature sensors, etc.). In some embodiments, data from the sensors 102a-102n may be used to acquire data used to implement dead reckoning positioning. In one example, the sensors 102a-102n may be various types of sensors (or sensor clusters) configured to determine vehicle movement (e.g., magnetometers, accelerometers, wheel click sensors, vehicle speed sensors, gyroscopes, etc.). In another example, data from the sensors 102a-102n may be used to determine distances and/or directions traveled from a reference point.

The electronic control units (ECU) 104a-104n may be configured to receive input (e.g., sensor data and/or sensor readings) from one or more of the sensors 102a-102n. The electronic control units 104a-104n may be an embedded system configured to manage and/or control different electrical functions of the vehicle 50. The electronic control units 104a-104n may be configured to interpret the sensor data from the sensors 102a-102n. In an example, interpreting the sensor data may enable the electronic control units 104a-104n to create a data model representing what is happening near the vehicle 50, within the vehicle 50 and/or to one or more of the components of the vehicle 50. Interpreting the sensor data may enable the electronic control units 104a-104n to understand the environment and/or make evidence-based decisions.

In some embodiments, multiple types of electronic control units 104a-104n may be implemented. For example, the electronic control units 104a-104n may comprise an Engine Control Module (ECM), a Powertrain Control Module (PCM), a Brake Control Module (BCM), a General Electric Module (GEM), a Transmission Control Module (TCM), a Central Control Module (CCM), a Central Timing Module (CTM), a Body Control Module (BCM), a Suspension Control Module (SCM), an Airbag Control Module (ACM), an Advanced Driver Assistance Module (ADAM), etc. The number and/or types of electronic control modules 104a-104n may be varied according to the design criteria of a particular implementation.

In some embodiments, the electronic control units 104a-104n may determine one or more corrective measures to perform in response to the data model(s) generated based on the sensor data. In one example, the corrective measures implemented by the Engine control module (ECM) electronic control unit 104a may control fuel injection, ignition timing, engine timing and/or interrupt operation of an air conditioning system in response to sensor data from the sensors 102a-102n (e.g., engine coolant temperature, air flow, pressure, etc.). In another example, corrective measures implemented by the ACM electronic control unit 104b may control air bag deployment in response to inertial, contact and/or proximity sensor data by monitoring the sensors 102a-102n. In yet another example, corrective measures implemented by the electronic control unit 104c may comprise activating a warning light (e.g., check engine, coolant temperature warning, oil pressure warning, ABS indicator, gas cap warning, traction control indicator, air bag fault, etc.). The number, type and/or thresholds for sensor data used to initiate the corrective measures may be varied according to the design criteria of a particular implementation.

The actuators 106a-106n may be components of the vehicle 50 configured to cause an action, move and/or control an aspect of the vehicle 50. The actuators 106a-106n may be configured to perform the corrective measures. For example, the actuators 106a-106n may be one or more of a braking system, a steering system, a lighting system, windshield wipers, a heating/cooling system, a seatbelt system, an air bag system, etc. In some embodiments, the actuators 106a-106n may be configured to respond to information received from the ECUs 104a-104n. The ECUs 104a-104n may determine desired (e.g., optimum) settings for the output actuators 106a-106n (injection, idle speed, ignition timing, etc.). For example, if the ECU 104a implements a steering system, the ECU 104a may receive signals from one or more of the sensors 102a-102n indicating that an event (e.g., contact) with a nearby vehicle is likely and the ECU 104a may respond by generating one or more actuation signals configured to cause the actuators 106a-106n to change a direction of the vehicle 50 (e.g., a corrective measure).

In some embodiments, the sensors 102a-102n and/or the actuators 106a-106n may be implemented to enable autonomous driving of the vehicle 50. For example, the sensors 102a-102n may receive and/or capture input to provide information about the nearby environment and/or the interior of the vehicle 50. The information captured by the sensors 102a-102n may be used by components of the vehicle 50 and/or the ECUs 104a-104n to perform calculations and/or make decisions. The calculations and/or decisions may determine what actions the vehicle 50 should take. The actions that the vehicle 50 should take may be converted by the ECUs 104a-104n into signals and/or a format readable by the actuators 106a-106n. The actuators 106a-106n may cause the vehicle 50 to move and/or respond to the environment. Other components may be configured to use the data provided by the system 100 to make appropriate decisions for autonomous driving.

The corrective measures may be performed by the actuators 106a-106n. For example, the actuators 106a-106n may implement corrective measure systems and/or occupant protection control systems. The corrective measures may implement the decisions determined by the ECUs 104a-104n. The corrective measures may be actions and/or responses. The corrective measures may be real-world (e.g., physical) actions (e.g., movement, audio generation, electrical signal generation, etc.). In some embodiments, the corrective measures may comprise the deployment of restraint systems.

Various types of sensors and/or sensor clusters 102a-102n may be implemented by the apparatus 100. One of the sensors 102a-102n may be a seat belt sensor configured to detect the status of the seat belt buckle and provide the information to the Restraint Control ECU. One of the sensors 102a-102n may be a seat longitudinal distance sensor configured to detect the longitudinal position of the seat bottom and provide the information to the Restraint Control ECU. One of the sensors 102a-102n may be a seat horizontal distance sensor configured to detect the lateral position of the seat bottom and provide the information to the Restraint Control ECU. One of the sensors 102a-102n may be a seat rotation sensor configured to detect the rotational angle/position of the seat bottom and provide the information to the Restraint Control ECU.

One of the sensors 102a-102n may be a seat back angle sensor configured to detect the angle/position of the seat back and provide the information to the Restraint Control ECU. One of the sensors 102a-102n may be an occupant presence sensor configured to detect if a seat is occupied and provide the information to the Restraint Control ECU. One of the sensors 102a-102n may be an occupant type sensor configured to detect the type of occupant in a seat and provide the information to the Restraint Control ECU. One of the sensors 102a-102n may be a shoulder belt distance sensor configured to detect the distance of the shoulder belt and provide the information to the Restraint Control ECU. One of the sensors 102a-102n may be a lap belt distance sensor configured to detect the distance of the lap belt and provide the information to the Restraint Control ECU.

Various types of the actuators 106a-106n may be implemented by the apparatus 100. One of the actuators 106a-106n may be a lap belt motor configured to control the distance of the lap belt. One of the actuators 106a-106n may be a shoulder belt motor configured to control the distance of the shoulder belt. One of the actuators 106a-106n may be a seat distance latch configured as a motor/pyro/gas mechanism to disengage the latch mechanism that locks the longitudinal and/or lateral location of the seat bottom. One of the actuators 106a-106n may be a seat rotation latch configured as a motor/pyro/gas mechanism to disengage the latch mechanism that locks the rotational angle/position of the seat bottom.

One of the actuators 106a-106n may be a seat back lifter configured as a motor/pyro/gas mechanism to return the seat back to 90 (near 90) degree tilt. One of the actuators 106a-106n may be a seat bottom front lifter configured as a motor/pyro/gas mechanism to angle the front of the seat bottom upwards to mitigate slipping under a seatbelt when the seat is reclined. One of the actuators 106a-106n may be a seat bottom rear lifter configured as a motor/pyro/gas mechanism to angle the front of the seat bottom upwards to mitigate slipping under a seatbelt for a non-front-facing occupant. One of the actuators 106a-106n may be a left divider airbag/curtain (lateral) that may deploy from the headliner to mitigate lateral contact between occupants and/or objects. One of the actuators 106a-106n may be a right divider airbag/curtain (lateral) that may deploy from the headliner to mitigate lateral contact between occupants and/or objects.

One of the actuators 106a-106n may be a center divider airbag/curtain (lateral) that may deploy from the headliner to mitigate lateral contact between occupants and/or objects. One of the actuators 106a-106n may be a left divider airbag/curtain (longitudinal) that may deploy from the headliner to mitigate longitudinal contact between occupants and/or objects. One of the actuators 106a-106n may be a right divider airbag/curtain (longitudinal) that may deploy from the headliner to mitigate longitudinal contact between occupants and/or objects. One of the actuators 106a-106n may be a center divider airbag/curtain (longitudinal) that may deploy from the headliner to mitigate longitudinal contact between occupants and/or objects. One of the actuators 106a-106n may be a lap belt airbag that may deploy from within, or attached to, the lap seat belt to mitigate force and/or "submarining" (e.g., slipping under a seatbelt) of the buckled occupant. One of the actuators 106a-106n may be a shoulder belt airbag that may deploy from within, or attached to, the shoulder seat belt to mitigate force and/or "submarining" of the buckled occupant.

One of the actuators 106a-106n may be a lap belt curtain configured as an inflatable curtain that may deploy from within, or attached to, the lap seat belt to mitigate force and/or "submarining" of the belted occupant and/or mitigate contact between a belted occupant and other occupants and/or unsecured objects. One of the actuators 106a-106n may be a shoulder belt curtain configured as an inflatable curtain that may deploy from within, or attached to, the shoulder seat belt to mitigate force and/or "submarining" of the buckled occupant and/or may mitigate contact between a belted occupant and other occupants and/or unsecured objects. One of the actuators 106a-106n may be a seat-mounted side curtain (a life shell). One of the actuators 106a-106n may deploy from the bottom or side of a seat to mitigate the ejection of an occupant in a rotated seat. One of the actuators 106a-106n may be a far side airbag configured as a center-console airbag intended to mitigate contact between occupants. One of the actuators 106a-106n may be a lifecross airbag/curtain that may be a cross/X-shaped divider airbag/curtain (that may deploy from the headliner) configured to mitigate intra-cabin contact between occupants and/or objects within the cabin. One of the actuators 106a-106n may be a table airbag that may deploy from the surface(s) of a work/table to mitigate ejection of objects placed on work/table surface(s).

Figure 2:
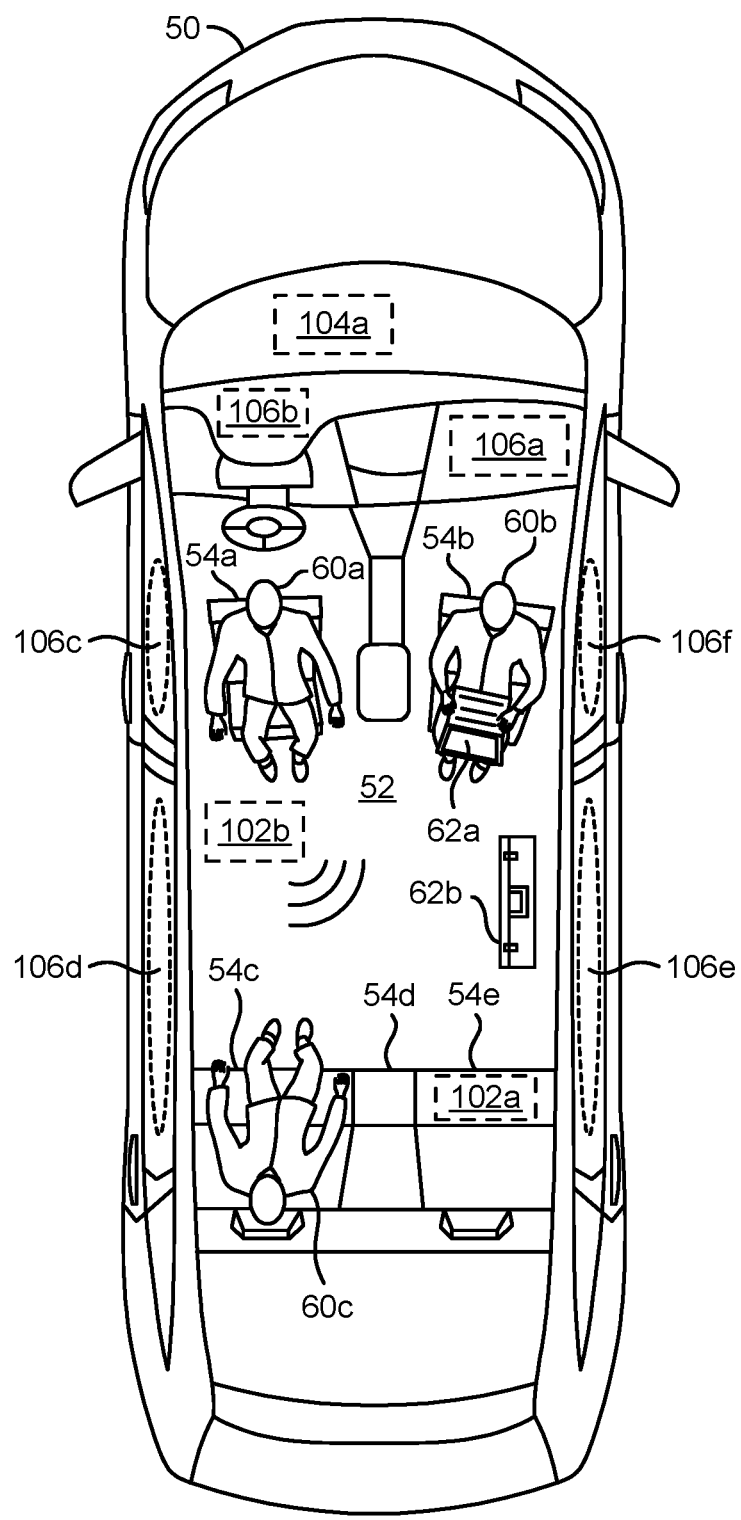
FIG. 2 is a diagram illustrating an interior of a vehicle.

Referring to FIG. 2, a diagram illustrating an interior 52 of the vehicle 50 is shown. A top-down view of the interior 52 is shown. The interior 52 of the vehicle 50 may comprise a number of seats 54a-54e. For example, the seat 54a and the seat 54b are each shown rotated away from the default (e.g., forward) seat orientation. Occupants 60a-60c are shown within the interior 52. For example, the occupant 60a is shown facing away from the steering wheel in the seat 54a, the occupant 60b is shown facing away from the dashboard in the seat 54b, the occupant 60c is shown in a default (e.g., forward) direction in the seat 54c and the seats 54d-54e are shown unoccupied. Objects (e.g., inanimate objects) 62a-62b are shown. For example, the object 62a may be a laptop held by the occupant 60b. In another example, the object 62b may be a briefcase resting on the floor of the interior 52. The arrangement and/or characteristics of the seats 54a-54e, the occupants 60a-60c and/or the objects 62a-62b may be a representative example and may vary according to the design criteria of a particular implementation and/or driving scenario.

The sensor 102a is shown in the seat 54e. The sensor 54e may be representative of a sensor configured to perform a physical detection of the interior 52. For example, the sensor 102a may represent a sensor cluster configured to various attributes of the seat 54e. The physical detection may be a measurement of a physical attribute. In an example, the physical detection may determine an attribute such as whether the seat 54e is occupied, an amount of recline of the seat 54e, a rotation angle of the seat 54e, an amount of weight on the seat 54e, whether a seatbelt associated with the seat 54e is connected, etc. The type of measurements performed by the physical sensor 54e may be varied according to the design criteria of a particular implementation.

The sensor 102b is shown in the interior 52. The sensor 102b may be representative of a sensor configured to perform a vision detection of the interior 52. For example, the sensor 102b may represent a sensor cluster configured to distinguish free space from occupied space. The vision detection may be a non-physical measurement of free space and/or occupied space within the interior 52. For example, the sensor 102b may implement a camera, LIDAR and/or radar. In one example, the sensor 102b may implement terahertz wave technology. The sensor 102b may be configured to determine characteristics (e.g., locations, sizes, body orientations, etc.) of the occupants 60a-60c. The type of technology implemented by the sensor 102b to perform the vision detection may be varied according to the design criteria of a particular implementation.

The ECU 104a is shown. The ECU 104a is shown in a front portion of the vehicle 50. The ECU 104a may be configured to receive the physical detections (e.g., from the sensor 102a) and/or the vision detections (e.g., from the sensor 102b). In the example shown, the ECU 104a may be a representative example. Multiple ECUs 104a-104n may be implemented to receive and/or analyze the physical detections and/or the vision detections. The location of the ECUs 104a-104n and/or the number of ECUs 104a-104n implemented may be varied according to the design criteria of a particular implementation.

Actuators 106a-106n are shown. The actuator 106a may be a passenger-side dashboard air bag. In one example, the actuator 106b may be a driver-side dashboard (or steering wheel) air bag. In another example, the actuator 106b may be a mechanism configured to move the steering wheel (e.g., hide the wheel when the vehicle 50 is driving autonomously). The actuators 106c-106f may be side (e.g., curtain) air bags. The actuators 106a-106f may be representative examples of corrective measures implemented by the vehicle 50 and/or controlled by the ECUs 104a-104n. For example, the actuators 106a-106f may implement electronic seat belts.

In some embodiments, the sensor 102a may be configured to detect if the seat 54e is occupied. The physical measurement by the sensor 102a may provide information to the Restraint Control ECU 104a. In some embodiments, the sensor 102a (or a cluster of physical detection sensors) may be configured to detect the type of occupant (e.g., height, weight, shape, body orientation, adult, child, etc.) in the seats 54a-54e and provide the information to the Restraint Control ECU 104a. In some embodiments, the sensor 102a (or cluster of physical detection sensors) may be configured to detect an absolute and/or relative location of the seats 54a-54e, an amount of rotation (e.g., degrees/radians away from the default front position) of the seats 54a-54e and/or an amount of recline (e.g., degrees/radians away from the default upright position) of the seats 54a-54e. In some embodiments, the sensor 102b (or a cluster of vision detection sensors) may be configured to detect an absolute and/or relative rotation and/or tilt of a critical occupant feature (e.g., head, chest, pelvis, lower body, etc.) relative to one or more of the corrective measures (e.g., air bags) and provide the information to the Restraint Control ECU 104a.

The apparatus 100 may be configured to implement at least two additional occupant seating characteristic (e.g., configuration) inputs for one or more of the ECUs 104a-104n. One input may be from one or more of the sensors 102a-102n configured to measure the seat rotation position. Another input may be from one or more of the sensors 102a-102n configured to measure a seat back angle. The additional inputs for rotation angle and back angle may be used separately/independently or may be combined to further enhance the decision-making for deploying the corrective measures. The rotation and back angle inputs (e.g., the seat orientation information) may be combined with other occupant/seating characteristics. The seat orientation information may be used by the apparatus 100 in conjunction with proximity and/or force sensors (e.g., to determine a likelihood and/or severity of an event) to determine appropriate corrective measures.

In some embodiments, the vision detection sensor 102b may be configured to take a snapshot of the interior 52 of the vehicle 50. In one example, the snapshot may be taken milliseconds before an event. For example, the vision detection sensor 102b may not be active until a signal (e.g., an event warning signal) is received by one or more of the ECUs 104a-104n and/or decisions made by the ECUs 104a-104n indicate that an event may be imminent. By performing the snapshot milliseconds before the event, the snapshot may be performed fewer times (e.g., once) instead of being performed continually. For example, performing the snapshot milliseconds before the event instead of continually may reduce an amount of processing, reduce power consumption, reduce an amount of exposure to radiation by the occupants, etc. The vision detection may enable a detection of the occupants 60a-60c and/or the objects 62a-62b (e.g., detection of body mass, location, orientation of body parts, critical features, etc.). Based on the snapshot of the interior 52 by the sensor 102b, the corrective measures 106a-106f (e.g., airbag and seatbelt deployment options) may be tuned and/or adapted. The tuning of the corrective measures may enable a response that is appropriate with respect to the orientation of the occupants 60a-60c.

In some embodiments, the sensor 102b may implement terahertz wave technology (or similar technologies) to perform the snapshot of the interior 52. The snapshot may enable the ECUs 104a-104n to understand the current environment of the interior 52. The detailed information provided by the snapshot may enable the ECUs 104a-104n to enable the corrective measures (e.g., restraints control module that may match the information in the snapshot to the information about a potential event (e.g., type, direction, severity, etc.)). The combination of occupant information from the snapshot and information about a potential event may enable the ECUs 104a-104n to provide a tailored and/or customized deployment of the corrective measures by operating the actuators 106a-106n in a particular way (e.g., based on the orientation of the occupants 60a-60c).

The sensor 102b implementing terahertz radar to provide the ECUs 104a-104n with an interior snapshot information may enable the ECUs 104a-104n to determine the occupant characteristics (e.g., orientation, height, size, position, location, mass, etc.). The ECUs 104a-104n may consider the snapshot information and/or information from other sensors 102a-102n. For example, some of the sensors 102a-102n may determine a severity of a potential event. The ECUs 104a-104n may adapt the corrective measure. For example, different features (e.g., gas retention, output pressure, time to fire, active venting, single and dual stages, air bag tethering/shaping, etc.) may be adjusted by the actuators 106a-106n.

In some embodiments, the visual sensor 102b (or cluster of sensors) may implement Time of Flight (ToF) cameras. For example, ToF cameras may be configured to understand occupant criteria. However, ToF cameras may have a large size and/or high cost. Generally, implementing the visual sensor 102b using terahertz radar on a system on chip (SoC) may be a low cost solution for generating the visual detection snapshot. The type of technology used to perform a mapping of the interior 52 may be varied according to the design criteria of a particular implementation.

In some embodiments, the corrective measures may be configured to dynamically alter conditions within the vehicle 50. For example, using the information provided by the snapshot (or other cabin mapping), the ECU 104a may form assumptions and/or analyze data construct models. The ECU 104a may use the assumptions to make decisions (e.g., determine the corrective measures) to dynamically alter the conditions of the interior 52. In one example, the ECU 104a may implement a system approach for someone too close to the steering wheel. The snapshot generated by the sensor 102b may provide visual detection information indicating that the occupant 60a is too close to the steering wheel. The ECU 104a may determine that the corrective measure may be to preposition the airbag by pulling the steering wheel into the dashboard to provide more space and then allow the air bag to operate (e.g., the actuator 106b may control the movement of the steering wheel and/or the deployment of an air bag).

In another example, the snapshot (e.g., the visual detection) may determine the location of the objects 62a-62b. For example, if the briefcase 62b is not secured, deploying the side air bag 106e may inadvertently cause the briefcase 62b to become a projectile. The ECU 104a may determine that the seat 54e is not occupied and deploying the air bag 106e may not provide protection (e.g., compared to the potential for injury caused by the brief case 62b).

The type of decisions made by the ECUs 104a-104n may vary based on the scenario, the forces acting on the vehicle 50, the amount of time before a potential event, the physical detections, the visual detections, the arrangement of the occupants 60a-60c, etc. The ECUs 104a-104n may select one or more corrective measures in response to the scenario. The corrective measures may comprise controlling a vehicle device such as restraints (e.g., air bag, seatbelt), trajectory controls (e.g., brakes, steering) and/or interior positioning controls (e.g., seat positioning, steering wheel positioning). In an example, the ECUs 104a-104n may control the actuators 106a-106n in order to adjust a timing of deployment of the air bag, perform seatbelt pre-tensioning, control the application of the brakes, engage/disengage autonomous steering, control a rotation of the seats 54a-54e, control an amount of recline of the seats 54a-54e, move the steering wheel, etc. The types of corrective measures available may be varied according to the design criteria of a particular implementation.

Figure 3:
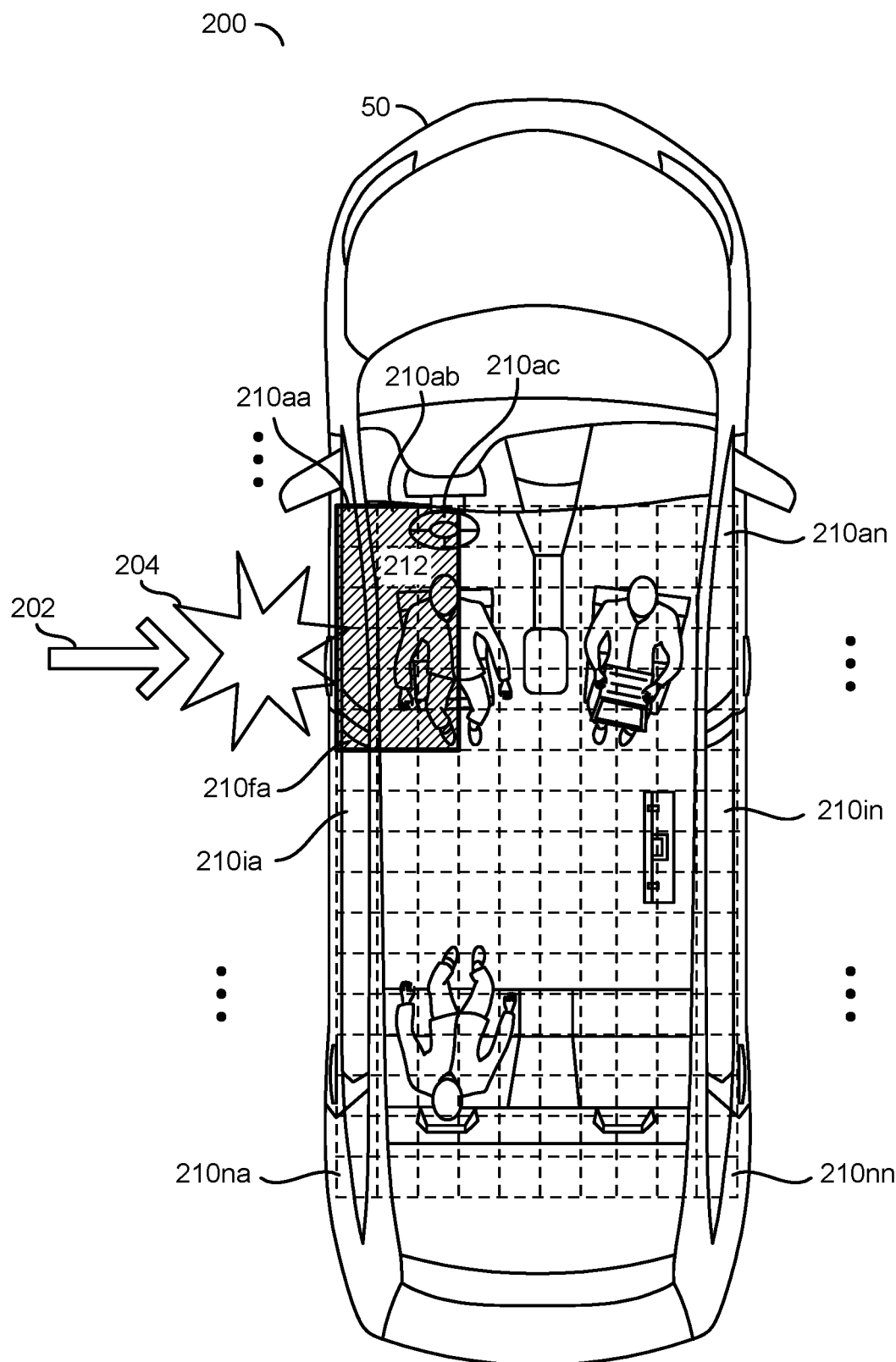
FIG. 3 is a diagram illustrating vehicle zones and an example keep-out zone.

Referring to FIG. 3, a diagram illustrating vehicle zones and an example keep-out zone is shown. A top view 200 of the vehicle 50 is shown. An arrow 202 is shown. The arrow 202 may represent an application of a force. A force application point 204 is shown. The force application point 204 may represent a location on the vehicle 50 that the force 202 has been applied. For example, the force 202 and/or the force application point 204 may represent an event. In the top view 200, the force 202 may be applied at the driver side door.

The interior 52 is shown having a number of zones 210aa-210nn. In the top view 200, the zones 210aa-210nn are shown as a two-dimensional evenly spaced grid (e.g., a single plane of the zones along the length and width of the vehicle 50 is shown as a representative example). The zones 210aa-210nn may be three-dimensional. The zones 210aa-210nn may have various sizes and/or shapes. For example, the 210aa-210nn may correspond to different areas of the interior 52 and/or the various components of the interior 52 (e.g., the car seats 54a-54e, a dashboard location, location of electronics, location of the steering wheel, location of the corrective measures, etc.). The size and/or shape of each of the zones 210aa-210nn may be varied according to the design criteria of a particular implementation.

A keep-out zone 212 is shown. In the top view 200, the keep-out zone 212 may comprise the zones covering an area from 210aa-210ac to 210fa-210fc. The keep-out zone 212 may correspond to the force application location 204 and/or the amount of the force 202.

The ECUs 104a-104n may determine a location of the occupants 60a-60c within the interior 52 (e.g., based on the snapshot and/or cabin mapping). The ECUs 104a-104n may correlate the location of the occupants 60a-60c with the zones 210aa-210nn. The ECUs 104a-104n may implement decision-making based on a current location of the occupants 60a-60c and the objects 62a-62b and/or future locations of the occupants 60a-60c and the objects 62a-62b.

The ECUs 104a-104n may implement predictive positioning. The predictive positioning may be based on the current location of the occupants 60a-60c (or the objects 62a-62b), the amount of the force 202 and/or the force location 204. For example, the ECUs 104a-104n may be configured to determine where the occupants 60a-60c and/or the objects 62a-62b may end up after the force 202 is applied at the force location 204. For example, the force 202 may cause a sudden movement to the right by the vehicle 50, which may cause the occupants 60a-60c to be thrown to the left side of the interior 52. In response to receiving the force 202, one corrective measure may be to rapidly apply the brakes (e.g., to prevent traveling off the road or into another lane). The ECUs 104a-104n may determine that the rapid deceleration of the vehicle 50 in response to one of the corrective measures may further cause the occupants 60a-60c and/or the objects 62a-62b to move forwards within the interior 52.

The ECUs 104a-104n may implement physical modeling, analyze vehicle dynamics, analyze relative locations of occupants and/or objects in the interior 52 to predict approximate potential locations of the occupants 60a-60c and/or the objects 62a-62b. The information used to perform the predictive analysis may be provided by the sensors 102a-102n. Generally, the snapshot that may be performed after an event is determined to be imminent may provide the latest available information. The apparatus 100 may be configured to fuse many attributes (e.g., perform sensor fusion) such as aspects of the occupants 60a-60c (and objects 62a-62b), the vehicle dynamics, pre-event data, event data (e.g., real-time data during the event), and/or predictive modeling to decide when and how to generate signals for the actuators 106a-106n (e.g., to implement the desired corrective measures).

Figure 4:
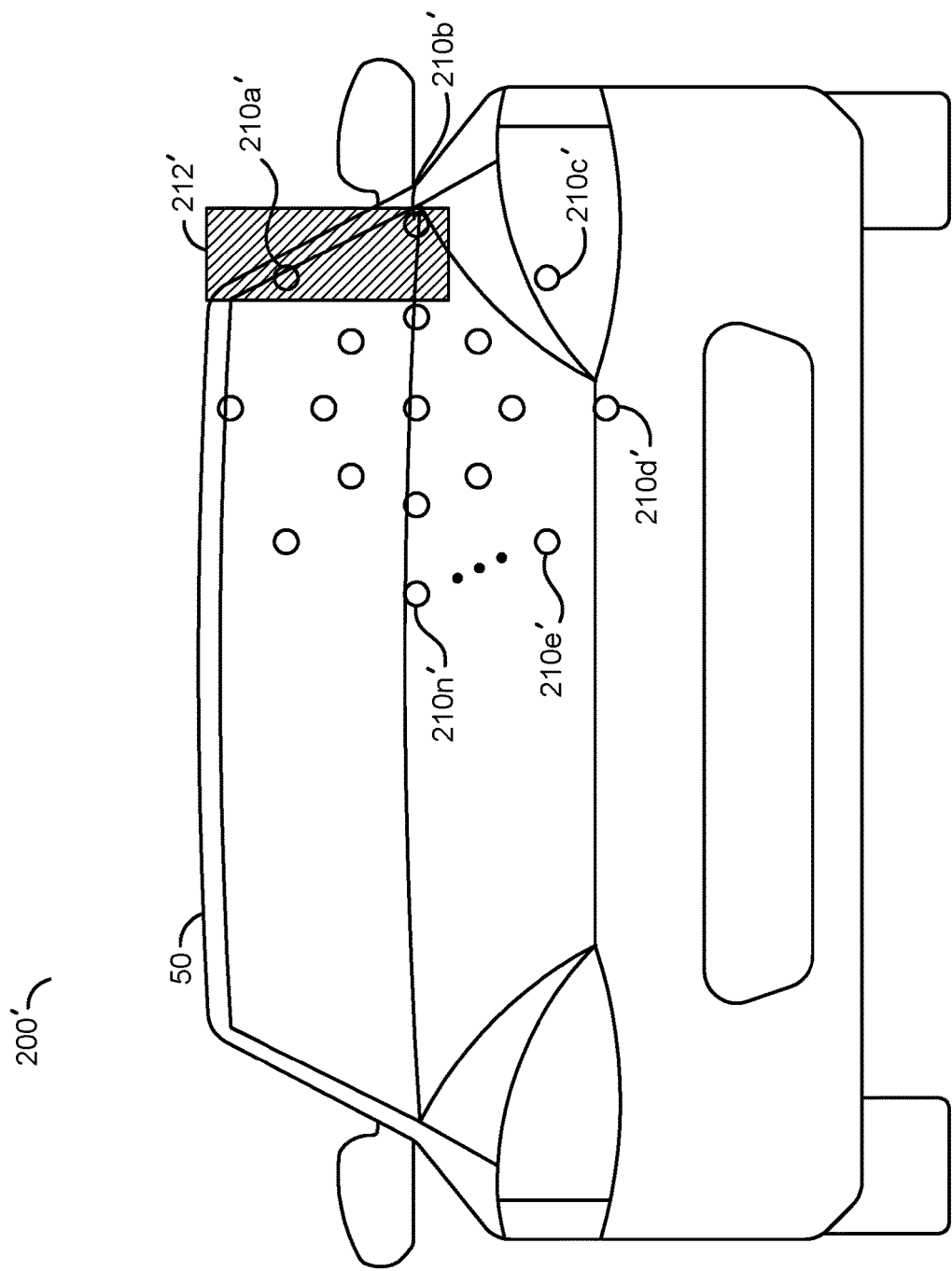
FIG. 4 is a diagram illustrating an alternate view of vehicle zones and an example keep-out zone.

Referring to FIG. 4, a diagram illustrating an alternate view 200' of the vehicle zones and an example keep-out zone is shown. The alternate view 200' may be a front view of the vehicle 50. The zones 210a'-210n' are shown. The front view 200' shows the zones 210a'-210n' represented along a plane (e.g., a plane along the width and height of the vehicle 50). Corresponding to the force 202 and the force location 204, the keep-out zone 212' is shown on the driver side of the vehicle 50. In the example shown, the zones 210a'-210b' may be within the keep-out zone 212'. The arrangement of the zones 210a'-210n' may be varied according to the design criteria of a particular implementation.

Generally, the corrective measures implemented by the ECUs 104a-104n may be configured to deploy according to a default arrangement of the occupants 60a-60c. For example, the conventional deployment of an air bag may be tested and/or optimized based on the assumption that the seats 54a-54e will be facing forwards. However, as shown in association with FIG. 2, the vehicle interior 52 may enable spatial-mobility. For example, occupants 60a-60b are shown having rotated 180 degrees from the default forward position. The ECUs 104a-104n may be configured to modify and/or adapt the corrective measures when the interior 52 is not in the default arrangement. For example, the interior 52 may not be in the default arrangement when the seats 54a-54e are rotated and/or when the occupants 60a-60c are not in expected positions (e.g., the seats 54a-54e have been moved, the occupants 54a-54e are not facing forwards, etc.). Examples of the interior when not in the default arrangement may be described in association with FIGS. 9-16.

In some embodiments, the apparatus 100 may be configured to suppress (or adapt) one or more of the corrective measures based on the seat-facing position and/or the force location 204. In some embodiments, the apparatus 100 may be configured to suppress (or adapt) the corrective measures based on the current and/or predictive position of the occupants 60a-60c, the objects 62a-62b and/or features of the vehicle 50. In one example, when the force application location 204 is at the driver side, the default corrective measures may be a deployment of a left-side air bag curtain. However, if the occupant 60a is not in the default forward-facing position and/or is within the keep-out zone 212' (determined by the ECUs 104a-104n) the apparatus 100 may adapt the deployment of the corrective measures. For example, the apparatus 100 may inhibit the left-side curtain air bag if the occupant 60a and/or one of the objects 62a-62b are within the keep-out zone 212' (e.g., not in the default orientation).

Figure 5:
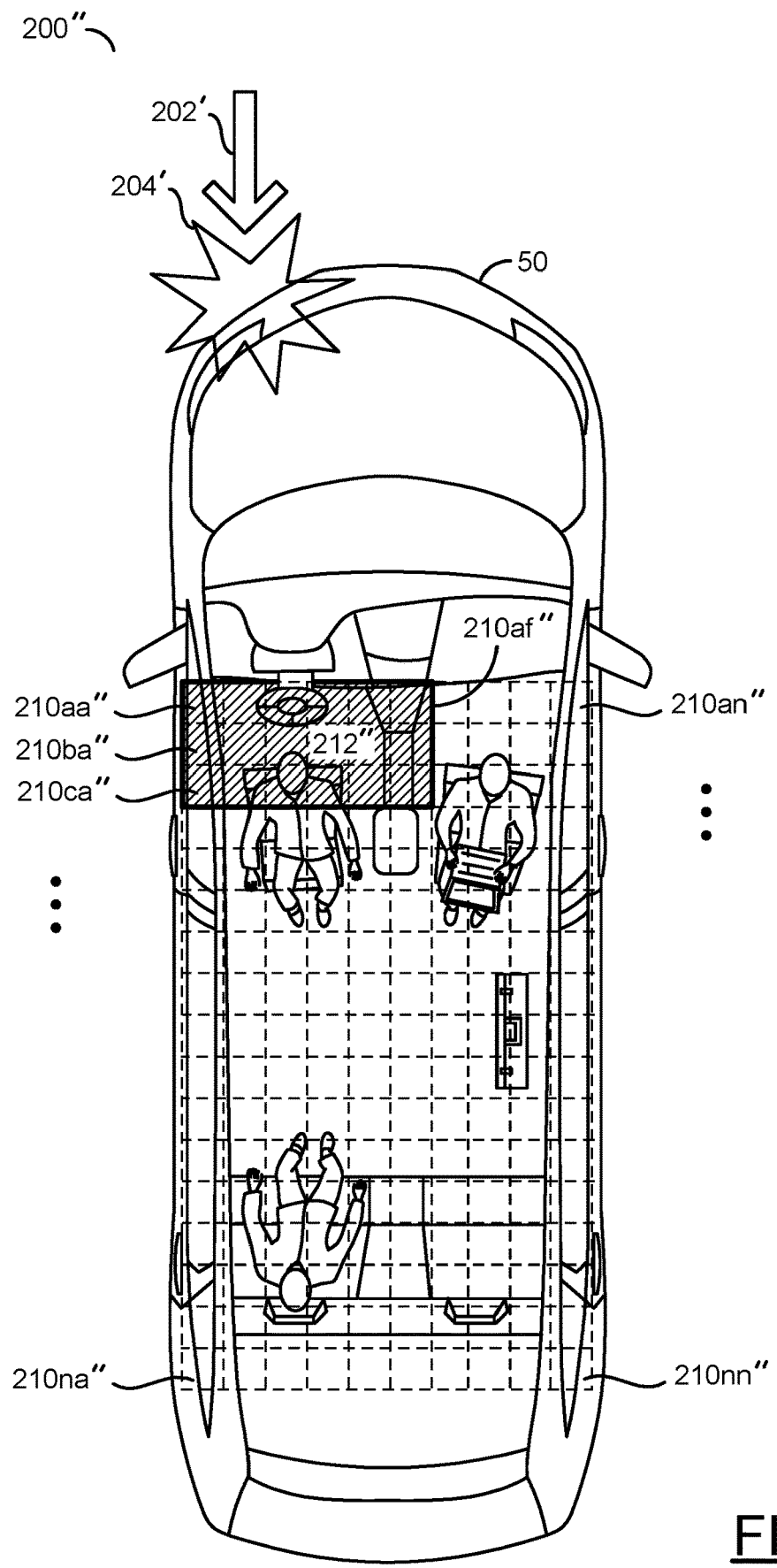
FIG. 5 is a diagram illustrating vehicle zones and an alternate keep-out zone.

Referring to FIG. 5, a diagram illustrating vehicle zones and an alternate keep-out zone is shown. An alternate top view 200" of the vehicle 50 is shown. An arrow 202' is shown. The arrow 202' may represent an application of a force. A force application point 204' is shown. The force application point 204' may represent a location on the vehicle 50 that the force 202' has been applied. In the top view 200", the force 202' may be applied at the front of the vehicle 50 on the driver side.

The keep-out zone 212" is shown. In the top view 200", the keep-out zone 212" may comprise the zones covering an area from 210aa"-210af" to 210ca"-210cf". The keep-out zone 212" may correspond to the force application location 204' and/or the amount of the force 202'.

In an example, the data from the sensors 102a-102n may be used by the ECUs 104a-104n to determine that an event may be imminent, likely and/or unavoidable. In one example, one of the ECUs 104a-104n may determine that the event (e.g., the force 202') is imminent and the corrective measure performed may be to send data to the other ECUs 104a-104n to perform other corrective measures. In one example, one of the ECUs 104a-104n may receive the information indicating that the event is imminent and the corrective measure may be to activate one of the sensors 102a-102n to perform the snapshot of the interior 52. Other of the ECUs 104a-104n may utilize the data from the snapshot to determine which corrective measures to perform. For example, the ECUs 104a-104n may implement a cascade of receiving information, interpreting the information and activating corrective measures (which, in turn, may provide information to other of the ECUs 104a-104n).

The ECUs 104a-104n may implement predictive positioning. The predictive positioning may be based on the current location of the occupants 60a-60c (or the objects 62a-62b), the amount of the force 202' and/or the force location 204'. For example, the force 202' may cause a sudden deceleration by the vehicle 50, which may cause the occupants 60a-60c to move forwards in the interior 52. In response to receiving the force 202', one corrective measure may be to deploy the air bags and/or provide seatbelt tensioning. In another example, in response to predicting the force 202' the recline angle of the seats 54a-54e may be adjusted to prevent the occupants 60a-60c from slipping underneath the seatbelts (e.g., submarining).

Figure 6:
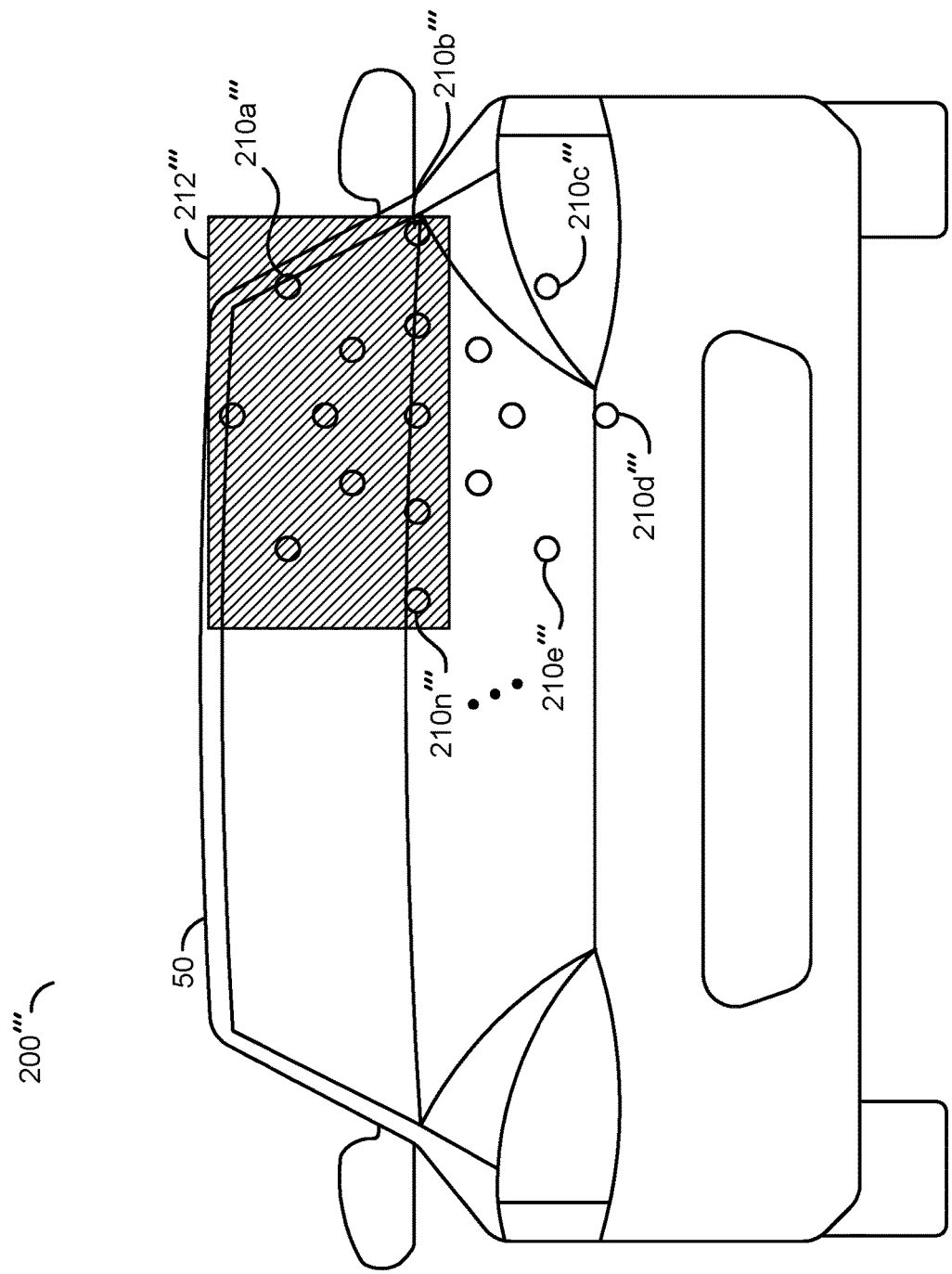
FIG. 6 is a diagram illustrating an alternate view of vehicle zones and an alternate keep-out zone.

Referring to FIG. 6, a diagram illustrating an alternate view 200''' of vehicle zones and an alternate keep-out zone is shown. The alternate view 200''' may be a front view of the vehicle 50. The zones 210a'''-210n''' are shown. The front view 200''' shows the zones 210a'''-210n''' represented along a plane (e.g., a plane along the width and height of the vehicle 50). Corresponding to the force 202' and the force location 204', the keep-out zone 212''' is shown on the driver side of the vehicle 50 and/or across the front of the vehicle 50.

In some embodiments, the apparatus 100 may be configured to suppress (or adapt) one or more of the corrective measures based on the seat-facing position and/or the force location 204'. In some embodiments, the apparatus 100 may be configured to suppress (or adapt) the corrective measures based on the current and/or predictive position of the occupants 60a-60c, the objects 62a-62b and/or features of the vehicle 50. In one example, when the force application location 204' is at the front of the vehicle 50 (e.g., the occupant 60a and/or the occupant 60b may be in the keep-out zone 212", as shown in association with FIG. 5), the default corrective measures may be a deployment of a high-powered frontal air bag. However, if the occupant 60a and/or the occupant 60b is not in the default forward-facing position and/or is within the keep-out zone 212" (determined by the ECUs 104a-104n) the apparatus 100 may adapt the deployment of the corrective measures. For example, the apparatus 100 may adapt the high-powered frontal air bag if the occupants 60a-60b and/or one of the objects 62a-62b are within the keep-out zone 212" (e.g., not in the default orientation). In one example, the steering wheel may be pulled within the dashboard as a corrective measure.

Figure 7:
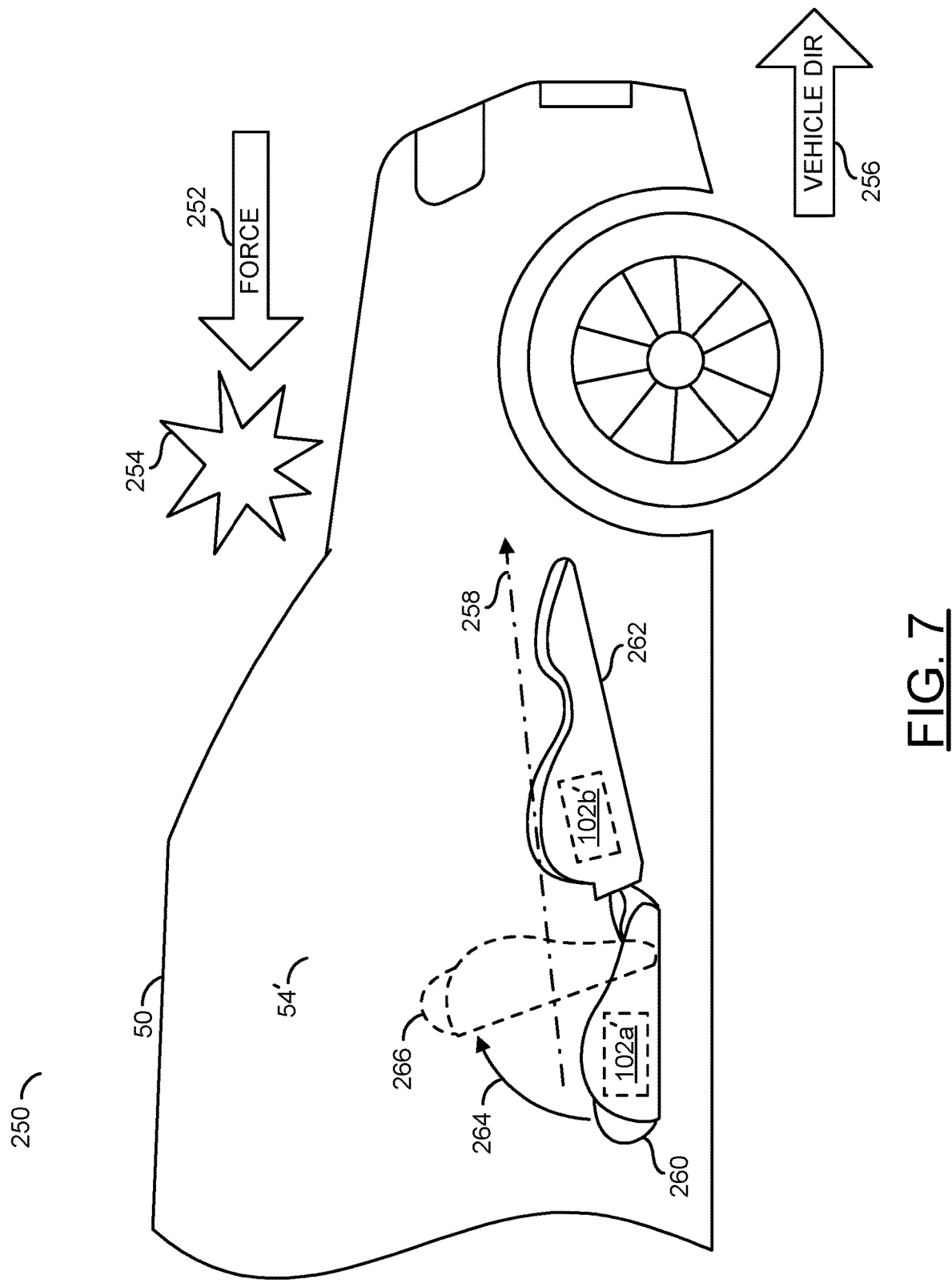
FIG. 7 is a diagram illustrating an example adapted corrective measure.

Referring to FIG. 7, a diagram illustrating an example of an adapted corrective measure is shown. A view 250 showing a side of the vehicle 50 is shown. An arrow 252 is shown. The arrow 252 may represent a direction of a force. The force 252 may be applied at the force point 254. For example, the force 252 and/or the force point 254 may represent an event. An arrow 256 is shown. The arrow 256 may represent a direction of travel of the vehicle 50. In the view 250, the vehicle 50 may be traveling to the right and may be stopped by the force 252 in the opposite direction. The force 252 may cause a rapid deceleration of the vehicle 50.

The seat 54' is shown within the vehicle 50. The seat 54' may be oriented to face opposite of the default forward position. The seat 54' is shown in a reclined position. An arrow 258 is shown. The arrow 258 may represent a direction of travel that occupants and/or objects in the interior 52 of the vehicle 50 may move relative to the vehicle 50 if the rapid deceleration occurs (e.g., predictive movements determined by the ECUs 104a-104n). If one of the occupants 60a-60c is seated in the seat 54' when the rapid deceleration occurs, the occupant may slip under the seatbelt and move in the direction 258.

The seat 54' may comprise a bottom portion 260 and a backrest portion 262. The sensor (or sensor cluster) 102a' is shown within the bottom portion 260. In some embodiments, the sensor 102a' may be configured to measure a rotation angle of the seat 54' (e.g., seat orientation information). For example, the sensor 102a' may perform a physical measurement of the rotation angle of the seat 54' with respect to the default forward position. In the example shown, the sensor 102a' may measure an angle of 180 degrees. In some embodiments, the sensor 102a' may measure seat orientation information corresponding to an angle of the bottom portion 260 with respect to the bottom of the vehicle 50 (e.g., an amount of forward lift). In the example shown, the sensor 102a' may measure a forward lift angle of 0 degrees.

The sensor (or sensor cluster) 102b' is shown within the backrest portion 262. In some embodiments, the sensor 102b' may be configured to measure a recline angle of the seat 54' (e.g., seat orientation information). For example, the sensor 102b' may perform a physical measurement of the recline angle of the seat 54' with respect to a default upright (e.g., 90 degree) orientation. In the example shown, the recline angle measured by the sensor 102b' may be approximately 90 degrees from upright. In some embodiments, the sensor 102b' may measure a status (e.g., fully reclined, partially reclined) instead of an exact angle measurement. The types of seat orientation information measurements performed by the sensors 102a'-102b' may be varied according to the design criteria of a particular implementation.

In some embodiments, when the force 252 is imminent, the apparatus 100 may perform a snapshot of the interior of the vehicle 50 to determine the position of the seat 54'. In some embodiments, the sensors 102a'-102b' may provide the seat orientation information. For example, in response to the seat orientation information, the ECUs 104a-104n may be configured to determine an appropriate corrective measure(s). Since the seat 54' is not in the default orientation, the apparatus 100 may be configured to adapt the corrective measures.

A corrective measure 264 is shown. The corrective measure 264 may be performed by one of the actuators 106a-106n. The corrective measure 264 may be implemented to lift up a front of the bottom portion 260 to the lifted position 266. For example, the sensor 102a' may further be configured to detect that the occupant is wearing a seatbelt (e.g., detect a seatbelt connected status). By lifting the bottom portion 260 to the lifted position 266, the seatbelt may be aligned to stop movement in the direction 258. When the corrective measure 264 moves the bottom portion 260 to the lifted position 266, the sensor 102b' may measure that the recline angle is 0 degrees. The sensor 102a' may be configured to measure a lift angle of the bottom portion 260.

Figure 8:
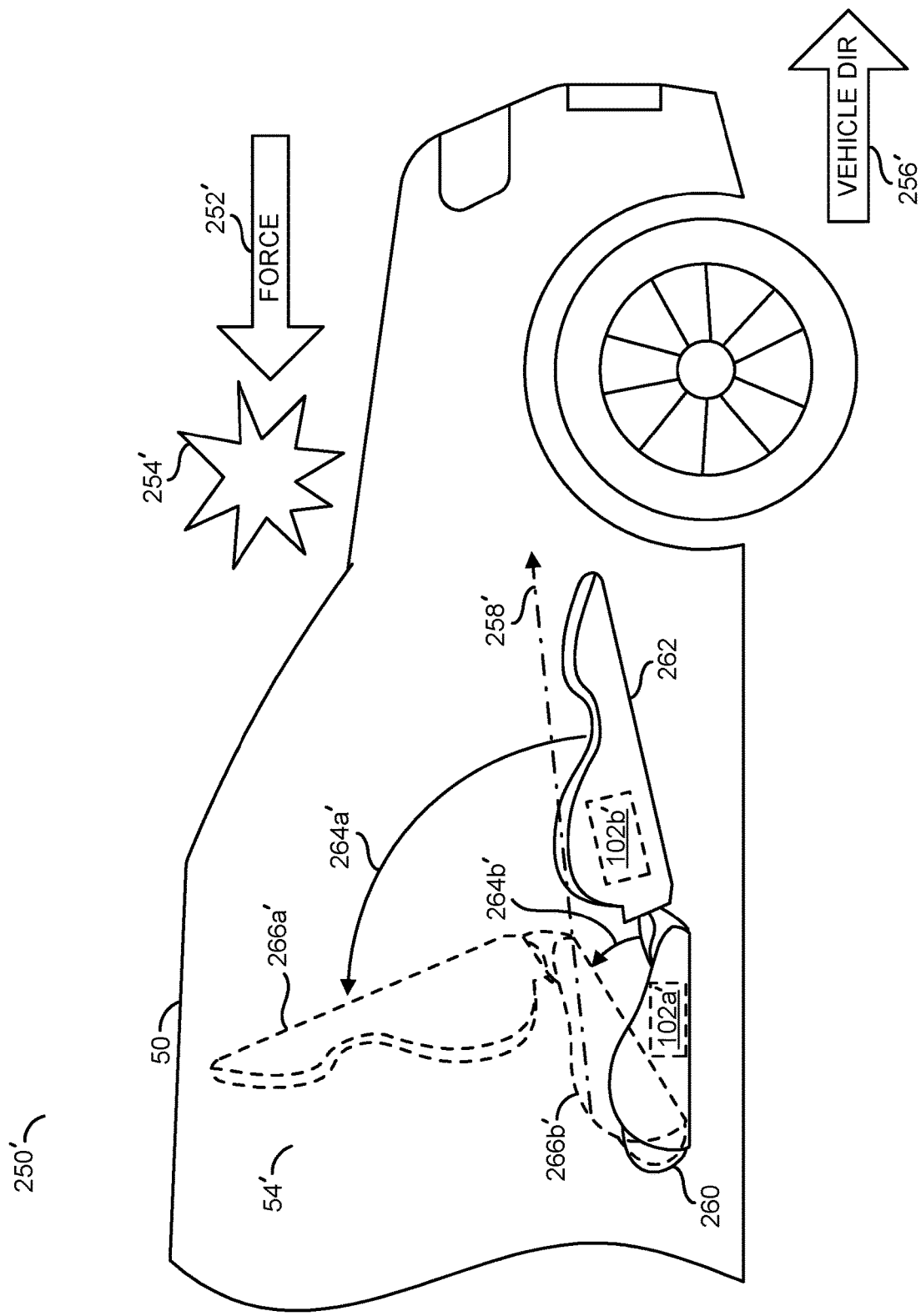
FIG. 8 is a diagram illustrating an alternate example of an adapted corrective measure.

Referring to FIG. 8, a diagram illustrating an alternate example of an adapted corrective measure is shown. A view 250' showing a side of the vehicle 50 is shown. An arrow 252' is shown. The arrow 252' may represent a direction of a force. The force 252' may be applied at the force point 254'. An arrow 256' is shown. The arrow 256' may represent a direction of travel of the vehicle 50. In the view 250', the vehicle 50 may be traveling to the right and may be stopped by the force 252' in the opposite direction. The force 252' may cause a rapid deceleration of the vehicle 50.

The seat 54' is shown within the vehicle 50. The seat 54' may be oriented to face opposite of the default forward position. The seat 54' is shown in a reclined position. An arrow 258' is shown. The arrow 258' may represent a direction of travel that occupants and/or objects in the interior 52 of the vehicle 50 may move relative to the vehicle 50 if the rapid deceleration occurs. If one of the occupants 60a-60c is seated in the seat 54' when the rapid deceleration occurs, the occupant may slip under the seatbelt and move in the direction 258'.

Conventional vehicle seats may be fixed to face the front of the vehicle (e.g., a zero-angle measured by the sensor 102a'). The sensor 102a' may be configured to measure seat angles for vehicles that enable the occupants 60a-60c to rotate a seat, or seats, to other angles (e.g., seat orientation information). For example, the sensor 102a' may be configured to measure an inward rotation seat orientation (e.g., 90 degrees from forward and perpendicular to the longitudinal axis of the vehicle 50). In another example, the sensor 102a' may be configured to measure a rear rotation seat orientation (e.g., 180 degrees from forward and facing the rear of the vehicle 50). In yet another example, the sensor 102a' may be configured to measure an angled rotation seat orientation (e.g., facing the origin/center of the interior 52 such as at an angle of 45 degrees, 135 degrees, etc.). The seat orientation information may comprise the seat rotation position. The apparatus 100 may use the seat orientation position to make decisions about the deployment and/or modification of the deployment of the corrective measures.

The sensor 102b' may measure the amount of adjustment of the angle of the seat backrest 262. For example, if the vehicle 50 is capable of driving autonomously, even the driver may recline the seat 54' to rest/sleep. The sensor 102b' may be configured to measure scenarios such as partial-recline and/or full-recline (e.g., lay-flat seat/bed). The seat orientation information may comprise the seat backrest position angle. For example, the ECUs 104a-104n may use the information from the sensor 102b' about the seat recline to determine a potential effectiveness of the seat belt and/or the seat back to provide restriction of occupant movement.

Corrective measure 264a'-264b' are shown. The corrective measures 264a'-264b' may be performed by one of the actuators 106a-106n. The corrective measures 264a'-264b' may be implemented to lift up the backrest portion 262 to the lifted position 266a' and a back of the bottom portion 260 to the lifted position 266b' (e.g., a rear lift). For example, the sensor 102a' may further be configured to detect that the occupant is not wearing a seatbelt (e.g., detect a seatbelt connected status). Since the seatbelt may not prevent the occupant from moving in the direction 258', the ECUs 104a-104n may determine alternate corrective measures 264a'-264b'. By lifting the backrest portion 262 to the lifted position 266a' and the bottom portion 260 to the lifted position 266b', the orientation of the seat 54' may be aligned to stop movement in the direction 258' even without a seatbelt connected. When the corrective measures 264a'-264b' move the backrest 262 to the lifted position 266a' and the bottom portion 260 to the lifted position 266b', the sensor 102b' may measure that the recline angle is 0 degrees (or near 0). The sensor 102a' may be configured to measure a lift angle of the bottom portion 260. In the example shown, the apparatus 100 may adapt the corrective measures (e.g., from the corrective measure 264 shown in association with FIG. 7 to the corrective measures 264a'-264b' shown in association with FIG. 8) based on the status of the seatbelt and/or the orientation information of the seat 54' measured by the physical sensors 102a'-102b'.

The seat orientation information may be used by the ECUs 104a-104n to make decisions about implementing and/or modifying the corrective measures (e.g., 264a'-264b'). Examples of corrective measures may comprise electronic seatbelt controls, seat lifters, bags-in-belts, etc. The apparatus 100 may modify how/when to provide existing corrective measures (e.g., inhibit an airbag when the occupant is fully-reclined).

Figure 9:
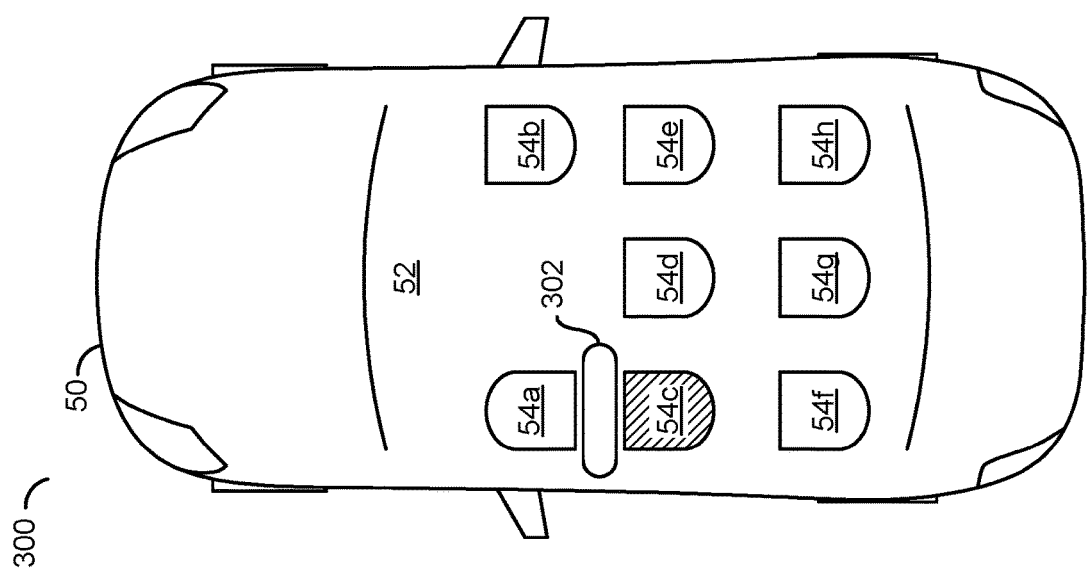
FIG. 9 is a diagram illustrating an example spatial-mobility configuration.

Referring to FIG. 9 a diagram illustrating an example spatial-mobility configuration 300 is shown. The interior 52 of the vehicle 50 is shown. A number of seats 54a-54h may be within the vehicle 50. One or more of the seats 54a-54h may be occupied by the occupants 60a-60h (not shown). In the orientation 300, the seat 54a may be in a reverse orientation, and the seats 54b-54h may be in a forward (default) orientation (e.g., rotated approximately 180 degrees). The seat 54c may be in a reclined position.

Each of the seats in the vehicle 50 (e.g., the seats 54a-54h) may comprise a corresponding one of the sensor clusters 102a'-102b' (described in association with FIGS. 7-8). Each of the seats 54a-54h may provide the seat orientation information. For example, the ECUs 104a-104n may receive separate seat orientation information for each seat. The seat orientation information may be aggregated using one or more of the ECUs 104a-104n to determine the seat orientation information and/or arrangement of the interior 52. The ECUs 104a-104n may deploy the corrective measures (e.g., interior air bags and/or airbag curtains), and/or make decisions to modify how/when to provide the corrective measures (e.g. inhibit a frontal air bag when the seat is rotated to the rear 180 degree position).

A corrective measure 302 is shown. The corrective measure 302 may be a second seat row divider air bag. In a default seating arrangement, the air bag 302 may be deployed when there is a force applied to the front of the vehicle 50. Similarly, when the seat 54c is rotated, the air bag 302 may be deployed when there is a force applied to the front of the vehicle 50. However, when the seat 54a and/or the seat 54c is reclined, the air bag 302 may be inhibited. For example, deploying the air bag 302 when the seat 54a and/or the seat 54c is reclined may have unexpected/untested consequences (e.g., a misfire of the deployment, pushing the occupant of the seat 54c upwards, damaging the seat 54c, etc.).

Figure 10:
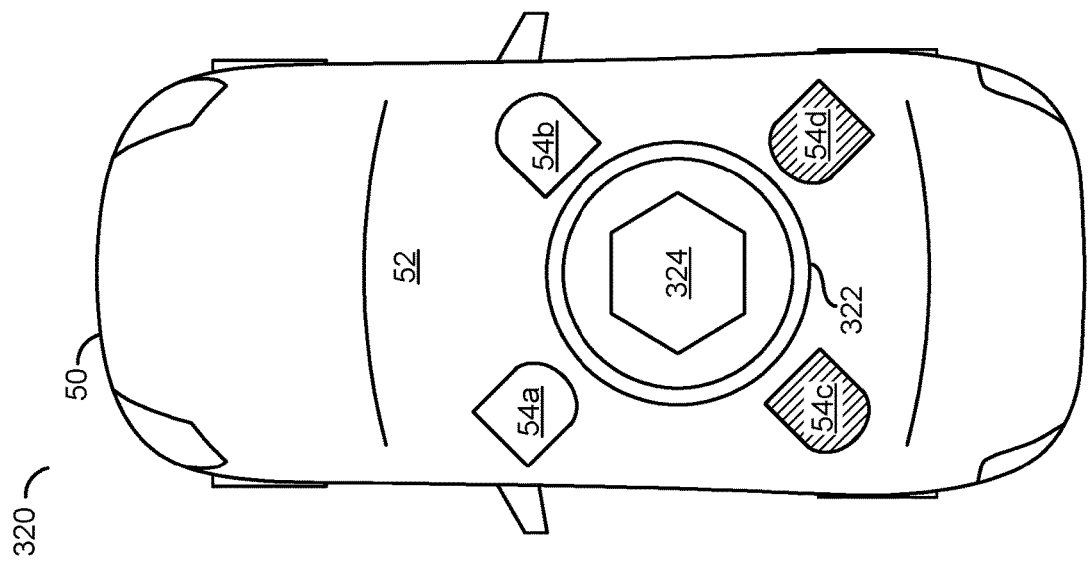
FIG. 10 is a diagram illustrating an example spatial-mobility configuration implementing a table.

Referring to FIG. 10, a diagram illustrating an example spatial-mobility configuration 320 implementing a table is shown. The interior 52 of the vehicle 50 is shown. A number of seats 54a-54d may be within the vehicle 50. One or more of the seats 54a-54d may be occupied by the occupants 60a-60d (not shown). In the orientation 320, the seats 54a and the seat 54d may be angled away from the central point of the interior 52 and the seat 54b and the seat 54c may be angled towards the central point of the interior 52. The seat 54c and the seat 54d may be in a reclined position. A table 324 is shown at the central point of the interior 52. For example, the configuration 320 may be a conference style and/or sight-seeing interior orientation.

A corrective measure 322 is shown. The corrective measure 322 may be a circular air bag surrounding the table 324. In some embodiments, the default orientation may not include the table 324 and the air bag 322 may not be deployed in the default orientation. In some embodiments, the default orientation may include the table 324 and each of the seats 54a-54d may be in the forward and upright orientation and the air bag 322 may be deployed. If the seat 54c is reclined, the air bag 322 may be deployed (e.g., the back portion 262 of the seat 54c may not interfere with the air bag 322). If the seat 54d is reclined, then the ECUs 104a-104n may inhibit the air bag 322 and/or a portion of the air bag 322. For example, the backrest 262 of the seat 54d may interfere with the deployment of the air bag 322.

Figure 11:
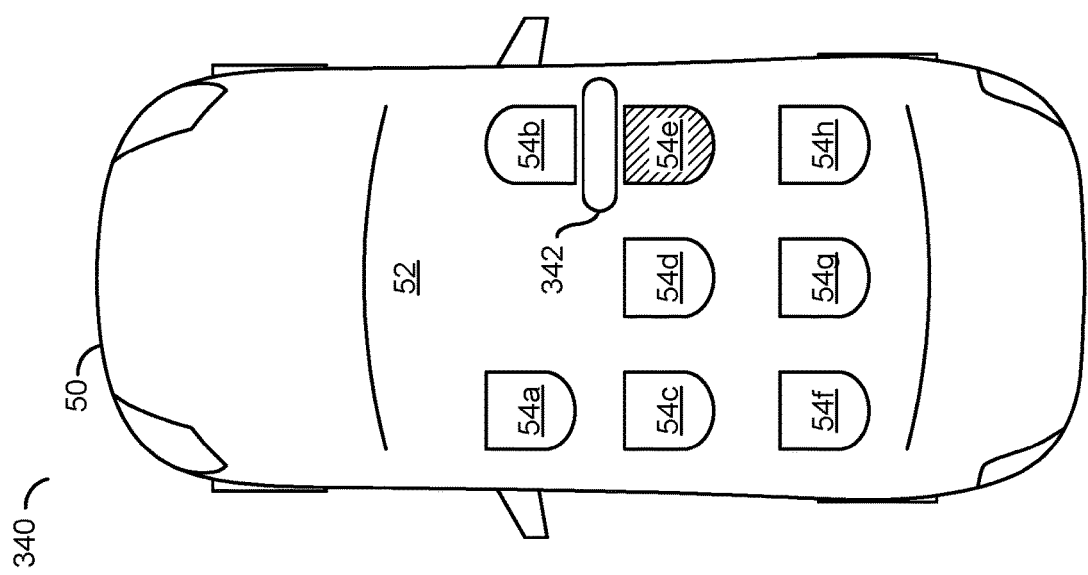
FIG. 11 is a diagram illustrating an alternate example spatial-mobility configuration.

Referring to FIG. 11, a diagram illustrating an alternate example spatial-mobility configuration 340 is shown. The interior 52 of the vehicle 50 is shown. A number of seats 54a-54h may be within the vehicle 50. One or more of the seats 54a-54h may be occupied by the occupants 60a-60h (not shown). In the orientation 340, the seats 54a and the seats 54c-54h may be in a default (e.g., front-facing) orientation and the seat 54b may be in a rotated rear-facing orientation. The seat 54e may be in a reclined position.

A corrective measure 342 is shown. The corrective measure 342 may be a second seat row divider air bag for the passenger side. In a default seating arrangement, the air bag 342 may be deployed when there is a force applied to the vehicle 50. Similarly, when the seat 54e is rotated, the air bag 342 may be deployed when there is a force applied to the vehicle 50. However, when the seat 54e (or the seat 54b) is reclined, the air bag 342 may be inhibited. For example, deploying the air bag 342 when the seat 54e is reclined may have unexpected/untested consequences (e.g., a misfire of the deployment, pushing the occupant of the seat 54e upwards, damaging the seat 54e, etc.). In another example, if the seat 54e is not occupied, or not installed, the air bag 342 may be deployed.

Figure 12:
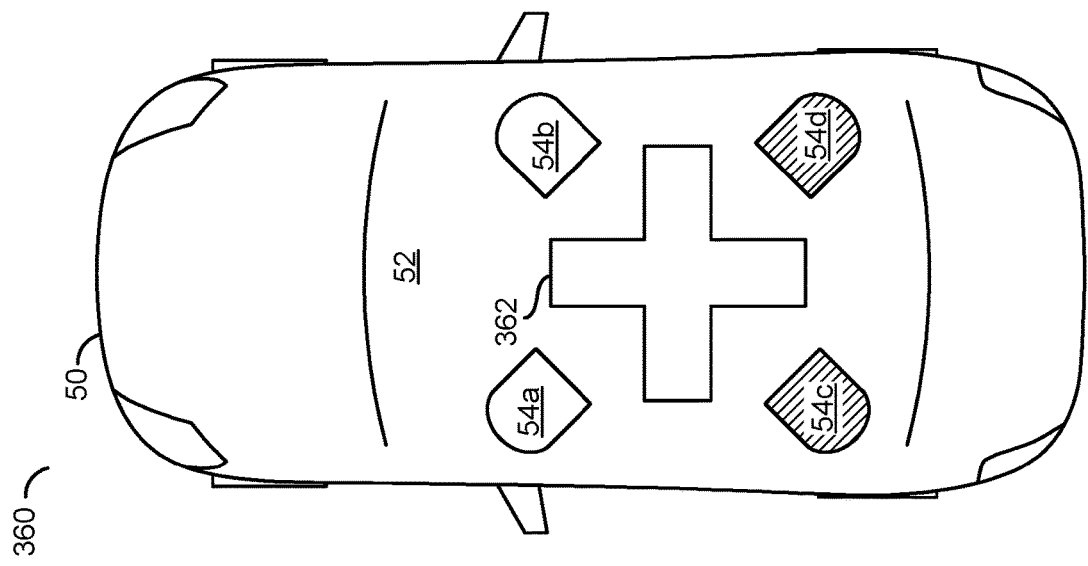
FIG. 12 is a diagram illustrating an example conference spatial-mobility configuration.

Referring to FIG. 12, a diagram illustrating an example conference spatial-mobility configuration 360 is shown. The interior 52 of the vehicle 50 is shown. A number of seats 54*a*-54*d* may be within the vehicle 50. One or more of the seats 54*a*-54*d* may be occupied by the occupants 60*a*-60*d* (not shown). In the orientation 320, the seats 54*a*-54*d* may be angled towards a central point of the interior 52. The seat 54*c* and the seat 54*d* may be in a reclined position. For example, the configuration 560 may be a conference style interior orientation.

A corrective measure 362 is shown. The corrective measure 362 may be a deployable vertical air bag (e.g., life cross). In some embodiments, the default orientation may include additional seats located in the same area as the air bag 362. For example, with the default interior orientation, the vertical air bag 362 may not be deployed as one of the corrective measures (e.g., since the air bag 362 may occupy the same zones as the seats). In the configuration 360, if the seats 54*a*-54*d* are not reclined, the air bag 362 may be deployed (e.g., the back portion 262 of the seats 54*a*-54*d* may not interfere with the air bag 362). If the seats 54*c*-54*d* are rotated and reclined, then the ECUs 104*a*-104*n* may inhibit the air bag 362 and/or a portion of the air bag 362. For example, the backrest 262 of the seat 54*c* may interfere with the deployment of the air bag 322. In some embodiments, the air bag 362 may be positioned to deploy having a shape that may not interfere with the reclined position of the seats 54*a*-54*d* and may be deployed whether or not the seats 54*a*-54*d* are reclined.

Figure 13:
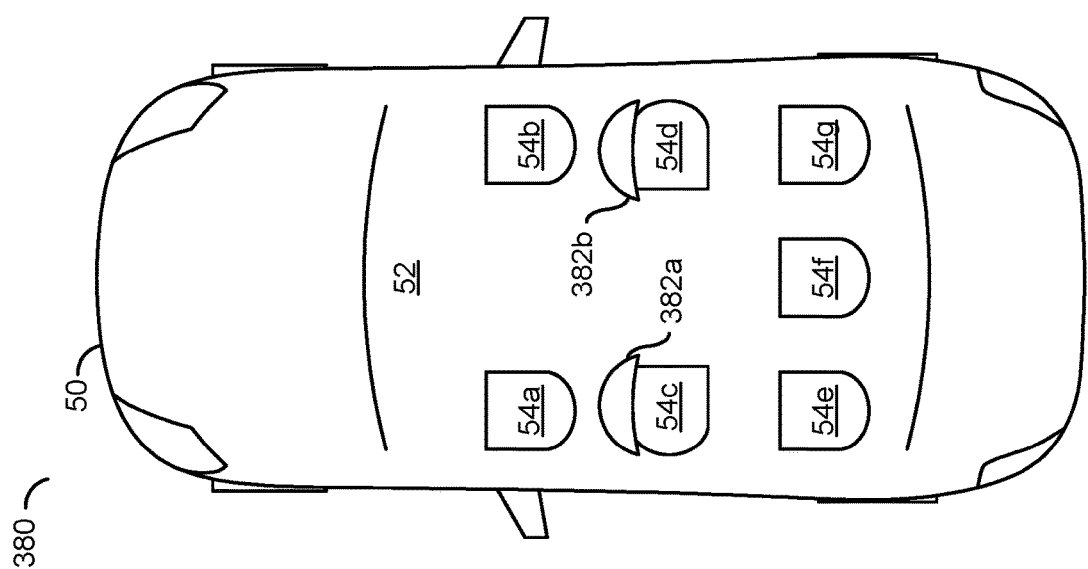
FIG. 13 is a diagram illustrating an example spatial-mobility configuration with rotated seats.

Referring to FIG. 13, a diagram illustrating an example spatial-mobility configuration 380 with rotated seats is shown. The interior 52 of the vehicle 50 is shown. A number of seats 54*a*-54*g* may be within the vehicle 50. One or more of the seats 54*a*-54*g* may be occupied by the occupants 60*a*-60*g* (not shown). In the orientation 380, the seats 54*a*-54*b* and the seats 54*e*-54*g* may be in the default (e.g., front-facing) orientation and the seats 54*c*-54*d* may be in a rotated (e.g., inward-facing) orientation. The seats 54*a*-54*g* may all be in an upright position.

Corrective measures 382*a*-382*b* are shown. The corrective measures 382*a*-382*b* may be a life shell. In a default seating arrangement (e.g., all the seats facing forward), the life shells 382*a*-382*b* may not be deployed when there is a force applied to the vehicle 50 (e.g., a vertical second row air bag may be deployed instead). The ECUs 104*a*-104*n* may predict that a frontal force applied to the vehicle 50 may cause the occupants in the seats 54*c*-54*d* to be pushed toward the front causing a sideways motion of the bodies and the corrective measures may be adapted to deploy the life shells 382*a*-382*b*.

Figure 14:
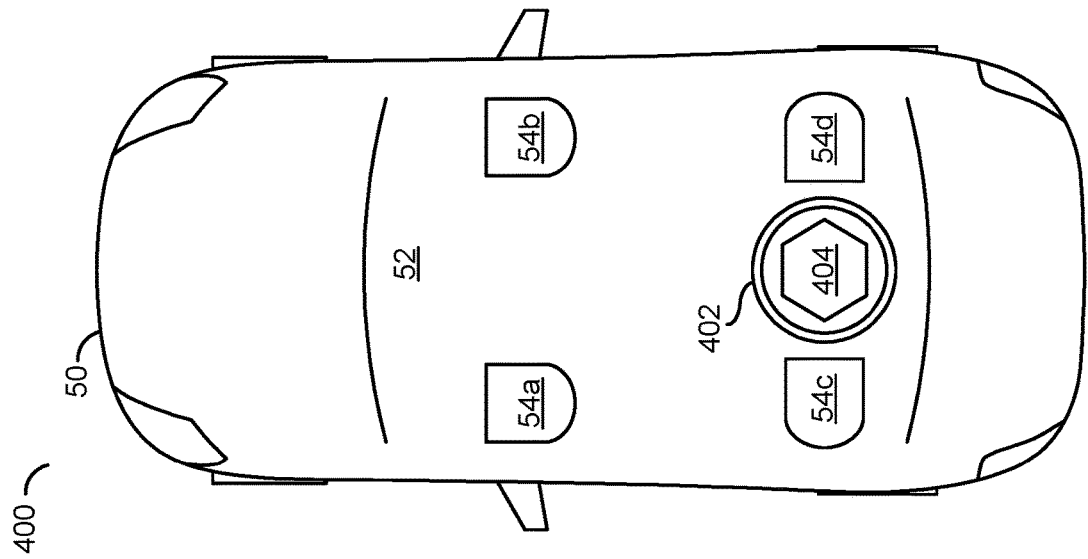
FIG. 14 is a diagram illustrating an example spatial-mobility configuration implementing a small table.

Referring to FIG. 14, a diagram illustrating an example spatial-mobility configuration 400 implementing a small table is shown. The interior 52 of the vehicle 50 is shown. A number of seats 54*a*-54*d* may be within the vehicle 50. One or more of the seats 54*a*-54*d* may be occupied by the occupants 60*a*-60*d* (not shown). In the orientation 400, the seats 54*a* and the seat 54*b* may be rotated towards a front of the vehicle 50 and the seats 54*c*-54*d* may each be rotated towards a middle of the vehicle 50. The seat 54*a*-54*d* may be in an upright position. A table 404 is shown at the back of the interior 52 and between the seats 54*c*-54*d*.

A corrective measure 402 is shown. The corrective measure 402 may be a circular air bag surrounding the table 404. In some embodiments, the default orientation may not include the table 404 and the air bag 402 may not be deployed in the default orientation. In some embodiments, the default orientation may include the table 404 and each of the seats 54*a*-54*d* may be in the forward and upright orientation and the air bag 404 may be deployed. If the seat 54*c* and/or the seat 54*d* are not reclined, the air bag 402 may be deployed (e.g., the back portion 262 of the seats 54*c*-54*d* may not interfere with the air bag 402). If the seat 54*c* and the seat 54*d* are rotated outwards and reclined, then the ECUs 104*a*-104*n* may inhibit the air bag 402 and/or a portion of the air bag 402. For example, the backrest 262 of the seats 54*c*-54*d* may interfere with the deployment of the air bag 402.

Figure 15:
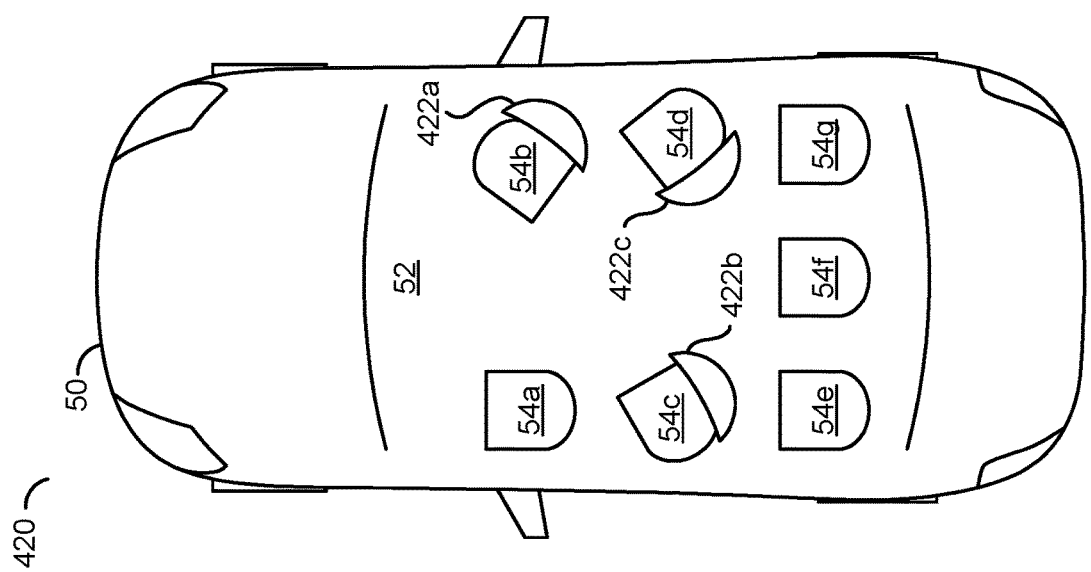
FIG. 15 is a diagram illustrating an alternate example spatial-mobility configuration with rotated seats.

Referring to FIG. 15, a diagram illustrating an alternate example spatial-mobility configuration 420 with rotated seats is shown. The interior 52 of the vehicle 50 is shown. A number of seats 54*a*-54*g* may be within the vehicle 50. One or more of the seats 54*a*-54*g* may be occupied by the occupants 60*a*-60*g* (not shown). In the orientation 420, the seats 54*a* and the seats 54*e*-54*g* may be in the default (e.g., front-facing orientation) and the seats 54*b*-54*d* may be in a rotated (e.g., angled) orientation. The seats 54*a*-54*g* may all be in an upright position.

Corrective measures 422*a*-422*c* are shown. The corrective measures 422*a*-422*c* may each implement a life shell. For example, the life shells 442*a*-442*c* may each be seat-mounted and individually deployable. In a default seating arrangement (e.g., all the seats facing forward), the life shells 422*a*-422*c* may not be deployed when there is a force applied to the vehicle 50. The ECUs 104*a*-104*n* may predict that a force applied to the vehicle 50 may cause the occupants in the seats 54*b*-54*d* to be pushed causing a sideways motion of the bodies. The corrective measures may be adapted to deploy the life shells 422*a*-422*c*.

Figure 16:
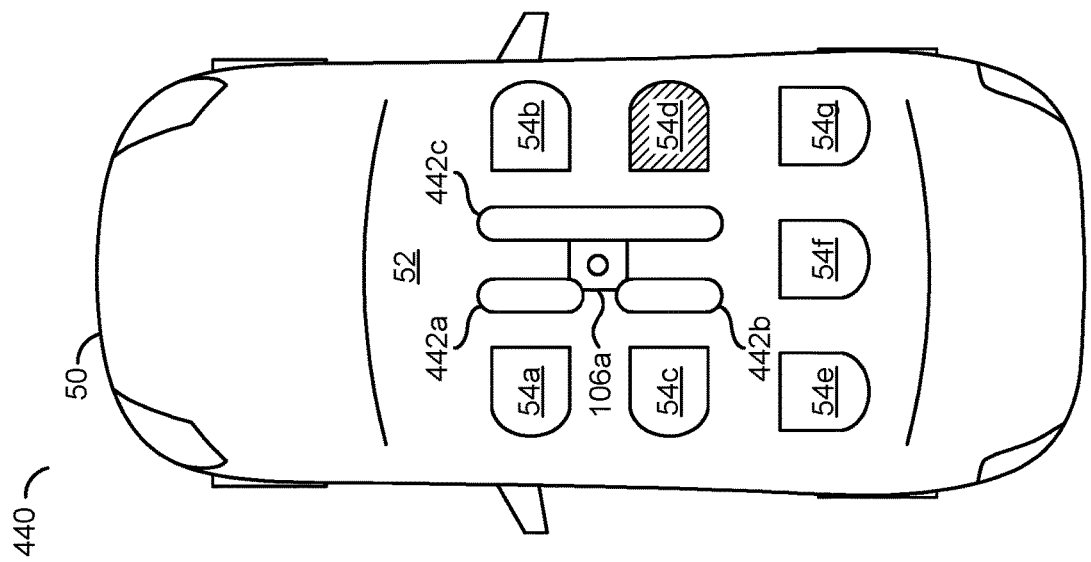
FIG. 16 is a diagram illustrating an example spatial-mobility configuration using vertical air bags.

Referring to FIG. 16, a diagram illustrating an example spatial-mobility configuration 440 using vertical air bags is shown. The interior 52 of the vehicle 50 is shown. A number of seats 54*a*-54*g* may be within the vehicle 50. One or more of the seats 54*a*-54*g* may be occupied by the occupants 60*a*-60*g* (not shown). In the orientation 440, the seats 54*a*-54*d* may each be in a rotated orientation towards a middle of the vehicle 50 and the seats 54*e*-54*g* may be in the default (e.g., front-facing) orientation. The seat 54*d* may be in a reclined position.

Corrective measures 442*a*-442*c* are shown. The corrective measures 442*a*-442*c* may be lateral divider air bags. In a default seating arrangement, the air bags 442*a*-442*c* may be inhibited. For example, forward facing seats may be located in the same zones as the air bags 442*a*-442*c* in the default orientation. If the seats 54*a*-54*d* are all in the upright orientation, the air bags 442*a*-442*c* may be deployed. In the example shown, the seat 54*d* is reclined. Since the reclined seat 54*d* and the air bag 442*c* may interfere with each other, the air bag 442*c* may be inhibited. Similarly, if the seat 54*b* is reclined, then the air bag 442*c* may be inhibited. In an example, if the seat 54*a* is reclined, then the air bag 442*a* may be inhibited and if the seat 54*c* is reclined, then the air bag 442*b* may be inhibited.

The actuator 106*a* is shown. The actuator 106*a* may enable granular control over the deployment of the air bags 442*a*-442*c*. For example, if the seat 54*a* is reclined, but the seat 54*c* is not reclined then the actuator 106*a* may be instructed by the ECUs 104*a*-104*n* to inhibit the air bag 442*a* and deploy the air bag 442*b*.

The ECUs 104*a*-104*n* may be configured to modify the deployment of the corrective measures. Modifying the corrective measures may comprise selecting deployment attributes and/or characteristics. For example, the ECUs 104*a*-104*n* may modify a speed, shape and/or timing of the corrective measures. Modification of the deployment of the corrective measures may be varied according to the type of corrective measures available and/or the design criteria of a particular implementation.

Figure 17:
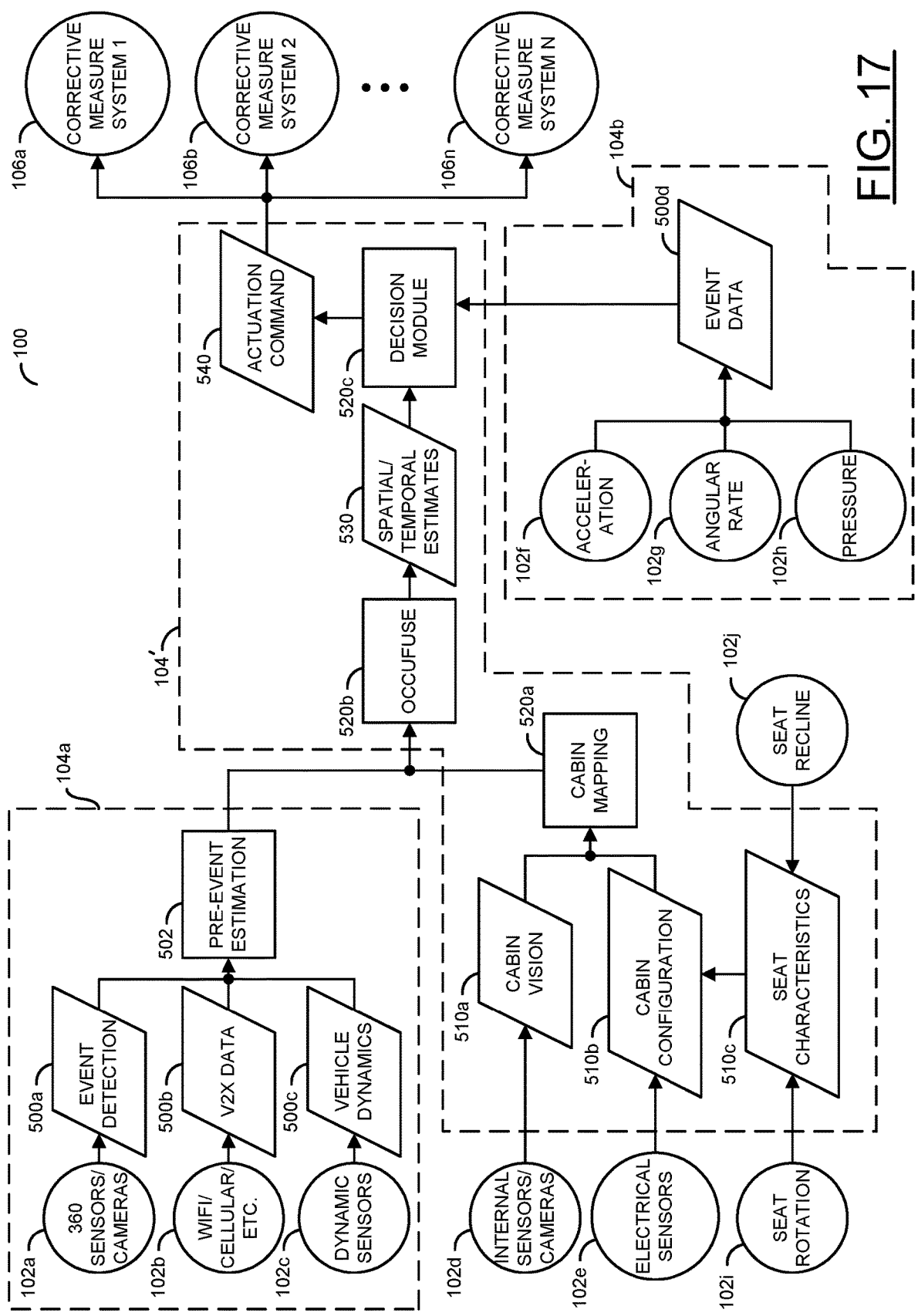
FIG. 17 is a diagram illustrating an example embodiment of the electronic control units.

Referring to FIG. 17, a diagram illustrating an example embodiment of the electronic control unit 104' is shown. A context of the apparatus 100 is shown comprising one ECU 104a, one ECU 104b and the ECU 104'. The ECU 104a may implement a pre-event estimation unit. The ECU 104b may implement a traditional event data unit. While the ECUs 104a-104b and the ECU 104' are each shown as a single unit, the data received and/or analyzed and/or the functionality described may be spread across various ECUs 104a-104n. The various sensors, interfaces and/or modules shown in the ECU 104a, the ECU 104b and/or the ECU 104' may be illustrative and each may comprise other components, features and/or functionality.

The ECU 104a may comprise and/or receive information from the sensor clusters 102a-102c. The sensors 102a may comprise cameras (e.g., 360 degree cameras, radar, LIDAR, thermal imaging, infrared, etc.). The sensors 102b may comprise communication devices (e.g., Wi-Fi, cellular, radio, etc.). The sensors 102c may comprise dynamic sensors (e.g., speed, acceleration, etc.). The ECU 104a may comprise interfaces (or data input/output) 500a-500c. The interface 500a may be an event detection interface configured to receive data from the sensor 102a. The interface 500b may comprise a V2X interface (e.g., vehicle-to-vehicle and/or vehicle-to-infrastructure communication) configured to receive data from the sensor 102b. The interface 500c may be a vehicle dynamics interface configured to receive data from the sensors 102c.

The ECU 104a may comprise a block (or circuit or module) 502. The module 502 may implement a pre-event estimation module. The module 502 may be configured to aggregate and/or analyze the information received from the interfaces 500a-500c. In one example, the module 502 may generate a pre-event estimation database. The pre-event estimation database may store information corresponding to what is about to happen to the vehicle 50 (e.g., contact with other vehicles and/or obstacles, amount of force that may be applied to the vehicle 50, where the force may be applied, etc.). The module 502 may be configured to determine if an application of force to the vehicle 50 (e.g., an event) is imminent. The module 502 may provide an event warning signal to the ECU 104'. For example, the event warning signal may comprise a classification of the event.

The ECU 104b may comprise and/or receive information from the sensor clusters 102f-102h. The sensors 102f may comprise acceleration sensors. The sensors 102g may comprise angular rate sensors. The sensors 102h may comprise pressure sensors. The ECU 104b may comprise an interface (or data input/output) 500d. The interface 500d may be configured to provide conventional event data. The interface 500d may provide the event data to the ECU 104'.

The ECU 104' may be configured to determine the interior information about the vehicle 50. The ECU 104' may comprise (or receive sensor data from) the sensor clusters 102d-102e and/or the sensor clusters 102i-102j. The sensors 102d may comprise internal cameras and/or sensors (e.g., time-of-flight cameras, LIDAR, terahertz wave radar, etc.). The sensors 102e may comprise electrical sensors (e.g., seat pressure sensors, seat belt connectors, seat installed/uninstalled detectors, etc.). The sensors 102i may comprise seat rotation sensors. The sensors 102j may comprise seat recline sensors.

The ECU 104' may comprise a number of blocks (or circuits or outputs or modules or interfaces) 510a-510c. The blocks 510a-510c may represent data output from the various sensor clusters. The interfaces 510a-510c may be configured to receive the sensor data. The interface 510a may be a cabin vision interface configured to receive the vision detection data from the sensors 102d. The interface 510b may be a cabin configuration interface configured to receive the physical detection data from the sensors 102e. The interface 510c may be a seat characteristics interface configured to receive seat configuration information from the sensors 102i and/or the sensors 102j. In some embodiments, the seat characteristic information from the interface 510c may be used to determine the cabin configuration data.

The ECU 104' may comprise blocks (or circuits or modules) 520a-520c, a block (or circuit or module) 530 and/or an interface 540. The module 520a may implement a cabin mapping module. The module 520b may comprise an occufuse module. The module 520c may implement an output determination module. The module 530 may implement a spatial/temporal estimation module. In some embodiments, the block 530 may be a data output. The modules 520a-520c and/or the module 530 may each comprise processors and/or memory for reading, storing and performing computer executable instructions. The interface 540 may be configured to present an actuation command. The actuation command may be the corrective measures output to the actuators 106a-106n. The corrective measures may be performed by the actuators 106a-106n.

The cabin mapping module 520a may be configured to perform the mapping of the interior 52. The cabin mapping module 520a may receive the vision detection information from the cabin vision interface 510a. In one example, the cabin vision interface 510a may present the snapshot of the interior 52. The cabin vision interface 510a may provide sensor data that may be used to "see" the interior 52. For example, the cabin vision data may sense and/or distinguish between free-space, occupants, objects, and/or critical features using non-physical contact technology. For example, the sensor cluster 102d may implement radar, LIDAR, sonic detection, cameras, infrared imaging, thermal imaging, etc.

The sensor cluster 102d may implement technology configured to provide information to the cabin vision interface 510a that may be used by the cabin mapping module 520a to identify items in the interior 52. For example, the occupants 60a-60c may be identified and/or classified. In another example, the inanimate objects 62a-62b (e.g., computer/tablet, backpack, briefcase, etc.) may be identified and/or classified. The occupants 60a-60c may be distinguished from the objects 62a-62b. For example, a priority classification may be implemented to indicate that the corrective measures should protect the occupants 60a-60c with a higher priority than the objects 62a-62b. The vision portion of the cabin mapping module 520a may be configured to identify and/or distinguish the critical features of the occupants 60a-60c. For example, the critical features may be the body parts of the occupants 60a-60c (e.g., head, neck, eyes, shoulder, chest, elbow, knee, pelvis, etc.). In some embodiments, the priority classification may indicate that the corrective measures should protect one critical feature (e.g., a head) with higher priority than another critical feature (e.g., an arm).

The cabin mapping module 520a may receive physical detection information from the cabin configuration interface 510b. The cabin configuration interface 510b may provide sensor data that may be used to "feel" the configuration of the interior 52. For example, the configuration data may sense attributes (e.g. presence, location, position, angle, etc.) of objects (e.g., seats, seatbelts and controls, steering wheels, etc.) using physical contact technology. For example, the electrical sensor cluster 102e may provide measurements of pressure, resistance, inductance, capacitance, magnetic fields, etc. In some embodiments, the physical detections received by the cabin configuration interface 510b and/or the seat characteristics interface 510c may comprise readings from one or more of a seat belt sensor, a seat longitudinal distance sensor, a seat horizontal distance sensor, a seat rotation angle sensor, a seat back angle sensor, a seat height sensor, an occupant state sensor, a steering wheel position sensor, a shoulder belt distance sensor and/or a lap belt distance sensor.

The cabin mapping module 520a may implement a system to process combinations of the cabin vision data and/or cabin configuration data to construct a map and/or data model of the interior 52. In one example, the cabin mapping module 520a may implement a cabin map database. The cabin map database may be used to store information corresponding to where everything is currently located within the interior 52 (e.g., the occupants 60a-60c, the objects 62a-62b, critical features, etc.). The mapping may comprise identification, classification, and/or location of occupants, objects, and critical features (CF) of the occupants and/or objects. For example, a critical feature of an occupant may be used to determine individual idiosyncrasies of an individual (e.g., wearing a cast, has feet on the dashboard, pregnant, etc.).

In some embodiments, the mapping performed by the cabin mapping module 520a may be a static snapshot. For example, the static snapshot may be performed after a particular threshold is met (e.g., an event is imminent, user activated, etc.). In some embodiments, the mapping performed by the cabin mapping module 520a may be dynamically updated (e.g., refreshed at a particular rate). In some embodiments, the refresh of the mapping may be performed by updating an initial template. For example, the update of the mapping may comprise incremental updates (e.g., only recording changes compared to a pre-determined point).

The sensor clusters 102e, the sensor clusters 102i and/or the sensor clusters 102j may implement technology configured to provide information to the seat characteristics interface 510c and/or the cabin configuration interface 510b that may be used by the cabin mapping module 520a to identify items in the interior 52. For example, the cabin mapping module 520a may use the information to determine whether elements of the interior 52 are installed, removed, damaged and/or connected (e.g., car seats, seat belts, steering wheel, consoles, tables, other structural elements, etc.). In one example, the cabin configuration data may be used to determine whether an air bag is installed (e.g., in the headliner, headrest, console, etc.).

The cabin configuration data may be used to determine orientation and/or other attributes of the cabin elements (e.g., determine whether the seats 54a-54e are facing forward or rearward, determine whether the steering wheel is extended outwards or retracted inwards, determine whether the driver seat 54a is fully reclined, determine whether a seat belt is buckled or unbuckled, determine an amount of weight on a seat, console, floor, etc., determine whether infotainment monitors and/or screens are opened or closed, etc.).

The cabin mapping module 520a may implement processing that is capable of performing various functions. In one example, the functions performed by the cabin mapping module 520a may classify each of the occupant 60a-60c and/or the objects 62a-62b (e.g., based on size, weight, asleep/awake status, emotional state, physical state (e.g., tired, alert, distracted, etc.), attached to anchor points, etc.).

In another example, the functions performed by the cabin mapping module 62a may classify critical features (e.g., dimensions and/or volume of the head of an occupant, the center of mass, the range of body parts, etc.) and/or identify specific locations of the critical features (e.g., single or multi-dimensional, distance between critical features, distance between the vision source (e.g., the sensor clusters 102d) and the eyes of the occupant, a relative distance between respective heads of two different occupants).

Distances may be determined based on specific (e.g., absolute) coordinates and/or relative to a fixed origin point (e.g., the center of the interior 52, relative to a camera lens, relative to a dynamic origin (e.g., occupant center of mass relative to the steering wheel air bag may be relative since the steering wheel air bag can move due to an ability of the steering wheel to rotate, extend, pivot, raise, etc.), relative to a feature of the vehicle such as the windshield, relative to a defined array of coordinates applied to a portion of or the entirety of the mobility interior 52 (e.g., the zones 210aa-210nn), relative to a defined area or volume (e.g., an air bag may occupy a specific volume of the interior 52 and the cabin mapping module 520a may detect whether an item or critical feature is within that specific volume), etc.).

The cabin mapping module 520a may be configured to acquire the cabin vision data from the cabin vision interface 510a and/or acquire the cabin configuration data from the cabin configuration interface 510b and/or the seat characteristics interface 510c. The cabin mapping module 520a may check that the data is reliable (e.g., error-check the data, compare to previous data, compare with data from other sensors, etc.). Data that is not reliable may be discarded. Using the cabin vision data, the cabin mapping module 520a may locate and/or classify the occupants 60a-60c, locate and/or classify the critical features of the occupants 60a-60c, locate and/or classify the objects 62a-62b and/or locate the free space of the interior 52.

Using the cabin configuration data, the cabin mapping module 520a may classify available occupancy (e.g., whether the seats 54a-54e are occupied/unoccupied), classify the available corrective measures (e.g., number, type and/or operational availability of the corrective measures) and/or classify moveable structures (e.g., the rotational angle of the seats 54a-54e, the recline angle of the seats 54a-54e, the height of the steering wheel, whether the seats 54a-54e are installed or removed, etc.). Using the cabin vision data and the cabin configuration data, the cabin mapping module 520a may build the cabin mapping model.

In some embodiments, the cabin mapping model may comprise the classification of the corrective measures. For example, each of the corrective measure systems 106a-106n may have a protection ID, a technology type (e.g., air bag, electronic seatbelts, moveable structures, seat lifters, etc.), an availability status (e.g., present/absent and/or functional/non-functional), a location (e.g., X,Y,Z coordinates, zone coordinates, absolute position in the interior 52, etc.), an orientation/rotation and/or an occupation zone (e.g., absolute or relative space that is occupied by the corrective measure when deployed). In some embodiments, the cabin mapping model may comprise the classification of the occupants 60a-60c. For example, each of the occupants 60a-60c may have an occupant ID, a seat position, species indicator (e.g., human, dog, cat, etc.), personal information (e.g., facial ID, retinal ID, age, sex, height, weight, etc.), body state and/or mood (e.g., resting, awake, drowsy, distracted, enraged, stressed, calm, aggravated, etc.), an orientation (e.g., sitting, standing, laying down, etc.) and/or bio-data (e.g., heart-rate, respiratory rate, body temperature, etc.).

In some embodiments, the cabin mapping model may comprise the classification of the critical features. For example, each of the critical features may have an ownership ID (e.g., which occupant the critical feature belongs to), a shield zone (e.g., relative free space to maintain between the critical feature and a structure/occupation zone of a corrective measure), coordinates with respect to the interior 52, coordinates relative to the objects 62a-62b and/or other occupants, a type (e.g., head, eyes, shoulders, chest, back, elbows, knees, feet, center of mass, etc.), and/or orientation (e.g., angle of the eyes such as yaw, pitch and roll, angle of the shoulders such as amount of pivoting, upright/hunched, bending status, angle of the back such as twisted, leaning and bending status). In some embodiments, the cabin mapping module 520a may comprise the classification of the detected objects 62a-62b. For example, each of the objects 62a-62b may have an object ID, an occupant possession (e.g., the laptop 62a is held by the occupant 60b and is held in the hands/lap/arms), restrained/unrestrained (e.g., the briefcase 62b is not anchored down), an object type (e.g., book, tablet, box, bag, etc.), a mass estimation, coordinates relative to the interior 52 and/or coordinates relative to other objects/occupants.

In some embodiments, the cabin mapping model may comprise the classification of the available occupancy. For example, the available occupancy may have an occupancy ID (e.g., a seat ID), an occupancy type (e.g., standing seat, racing seat, bench, couch, table, standing space, holding strap, support bar, etc.), a present/absent status, a location (e.g., coordinates of the seat bottom), an orientation/rotation, a recline angle, an amount of weight held (or capable of holding), a buckled/unbuckled status, a seat bottom height, a headrest height and/or a headrest angle. In some embodiments, the cabin mapping model may comprise the classification of the free space. For example, the free space may have an X,Y,Z coordinate of the interior 52.

The occufuse module 520b may be a system configured to process combinations (e.g., perform sensor fusion to combine information from disparate sources) of the cabin mapping (performed by the cabin mapping module 520a), the vision data and/or the configuration (e.g., physical) data. The occufuse module 520b may further receive the force warning from the ECU 104a and/or any available vehicle event information. For example, the occufuse module 520b may aggregate event prediction data and/or event classification data (e.g., data acquired during the event from the ECU 104b). The event prediction data may comprise information such as vehicle dynamics attributes and aspects, forward contact alert, cross traffic alert, lane departure alert, blind spot alert, intersection alert, V2V, V2X, etc. The event classification data may comprise attributes and aspects such as accelerations, angular rates, pressure changes, structure deformation, occupant protection technology state, etc.

The spatial/temporal estimation module 530 may be configured to generate predictive models of the interior 52. The spatial/temporal estimation module 530 may receive the fused data from the occufuse module 520b (e.g., the mapping information, the interior information, the seat orientation information, pre-event estimates and/or sensor data received during the event, etc.). In one example, the spatial/temporal estimation module 530 may implement a cabin map estimation database. The cabin map estimation database may be used to store information corresponding to where everything will be in the interior 52 in the near future.

In some embodiments, the spatial/temporal estimation module 530 may be implemented as a component of and/or data output of the occufuse module 520b. Using the fused data, the spatial/temporal estimation module 530 may determine probabilities and/or potential outcomes for the occupants 60a-60c and/or the objects 62a-62b in response to an applied force (or imminent force).

The occufuse module 520b and/or the spatial/temporal estimation module 530 may implement processing that is capable of performing functions such as predicting where a critical feature will be located in the near future. For example, if the head of an occupant is located at point A of the interior 52 prior to a force being applied to the vehicle 50, the head may reach point B of the interior 52 at a specific time based on the specific deceleration of the vehicle 50 relative to the head of the occupant. In another example, decisions may be based on whether the chest of an occupant is located outside or inside one of the zones 210aa-210nn (e.g., a portion of volume) of the interior 52 that could be occupied by a frontal air bag that could be deployed at a specific time based on the current location and the predicted frontal force caused by another vehicle (e.g., a force caused by another vehicle with a sedan body type that is traveling 35 mph that may be imminent in 2 seconds). In another example, the occufuse module 520b may detect that the chest of an occupant is facing forward but the head is facing rearward (e.g., the occupant is in a forward facing seat, but is looking behind) prior to a high severity frontal force and the spatial/temporal estimation module 530 may predict that based on expected vehicle deceleration the head of the occupant may enter the frontal air bag zone in a rearward facing position.

The occufuse module 520b may be configured to acquire the event detection data, the external map data (e.g., V2X data, static map data, real-time map data) and/or the vehicle dynamics data from the pre-event estimation module 502. The occufuse module 520b may check that the data is reliable (e.g., error-check the data, compare to previous data, compare with data from other sensors, etc.). Data that is not reliable may be discarded. Using the event detection data, the occufuse module 520b may classify the event (e.g., the type of object that may contact the vehicle 50). Using the external map data, the occufuse module 520b may classify the event scene (e.g., the environment around the vehicle 50). Using the vehicle dynamics data, the occufuse module 520b may classify the event type (e.g., location, direction and/or amount of force applied). Using the data from the pre-event estimation module 502, the occufuse module 520b may build a pre-event estimation model (e.g., a predictive model).

In some embodiments, the predictive model built by the occufuse module 520b may classify an event type. The classification of the event type may have an event ID, an event type (e.g., full frontal, frontal pole, offset, angular, rollover, vulnerable road user, side pole to front right door, rear, etc.), an event severity (e.g., based on vehicle state such as weight, speed, operating mode, etc., based on the vehicle dynamics such as deceleration, acceleration, rotation, etc., based on event object, etc.).

In some embodiments, the predictive model built by the occufuse module 520b may classify the event scene. The classification of the event scene may have a surface type (e.g., concrete, asphalt, gravel, grass, dirt, mud, sand, etc.), a surface state (e.g., smooth, bumpy, dry, uneven, low friction, etc.), a location type (e.g., freeway, cloverleaf ramp, bridge, urban intersection, residential street, county road, etc.), a vulnerable road user presence (e.g., pedestrians present, pedestrians absent, etc.), traffic status (e.g., crowded roads, light traffic, no traffic, stopped traffic, etc.), static obstacle presence (e.g., road signs, street lights, buildings, trees, etc.), weather conditions (e.g., current and preceding freezing temperature, current and recent heavy rainfall, current and preceding sunlight, etc.) and/or special situations (e.g., school zone, funeral procession, emergency vehicle present, accident scene, construction, power outage, etc.).

In some embodiments, the predictive model built by the occufuse module 520b may classify the event objects. The classification of the event objects may have an event object ID, an object type (e.g., tree, car, truck, SUV, semi, pedestrian, cyclist, animal, wall, structure, etc.), a relative orientation/rotation, a contact location (e.g., X,Y,Z coordinate relative to the vehicle 52), measured relative motion (e.g., stationary, parallel, perpendicular, vertical, angled, etc.) measured vector quantity velocity (e.g., applies if there is relative motion), measured characteristics (e.g., dynamics, weight, size, bumper height, grille height, structure, estimated weight, moveable/unmovable, density, etc.), received vector quantity/characteristics (e.g., from V2X data such as velocity, mass, size, etc.) and/or expected time to contact.

The decision module 520c may be configured to decide when and how to actuate and/or adapt the corrective measures. The decision module 520c may determine when and how to actuate and/or adapt the corrective measures based on results of processing done by the cabin mapping module 520b, the occufuse module 520b and/or the spatial/temporal estimation module 530. For example, decisions made by the decision module 520c may be determined in response to the interior mapping, the sensor fusion data and/or the predictive models.

The decision module 520c may implement processing that is capable of performing functions such as decision-making and actuation to adapt and/or suppress reversible and/or non-reversible corrective measures based on current and future locations and states of the critical features. In one example, the prediction by the module 520b and the module 530 may indicate that a head of an occupant may enter the frontal air bag zone in a rearward facing position at a high rate of speed in a high severity frontal force event and the decision module 520c may decide to suppress the frontal air bag to decrease risk of injury caused by the air bag. In another example, the prediction by the module 520b and the module 530 may indicate that the head of a child occupant may enter the rear-seat frontal air bag zone in a forward-facing position in a high severity frontal force scenario and the decision module 520c may decide to adapt the rear-seat frontal air bag to deploy in low-power mode to reduce an amount of force that may be applied to the child with normal (e.g., high-power) deployment and/or implement non-deployment (e.g., suppression of the air bag). In yet another example, the module 520a and the module 530 may detect a large inanimate object in the seating position (e.g., position 1) adjacent to a child occupant seated in the second row (e.g., position 2) in a side force application event and the decision module 520c may decide to deploy an air bag device between the two seating positions to reduce the force that could be caused by the object contacting the occupant when the force is applied. Similarly, if no object had been detected in position 2 (e.g., an empty seat), the decision module 520c may decide to suppress the air bag device between the two seating positions to lower an amount of injury risk to the occupant and/or reduce costs (e.g., cost to replace an air bag).

The decision module 520c may be configured to receive the cabin mapping model and/or the predictive model. For example, the decision module 520c may receive the models from the databases implemented by the cabin mapping module 520a and/or the occufuse module 520b. The decision module 520c may check that the data integrity of the databases is reliable (e.g., error-check the data, compare to previous data, compare with data from other sensors, etc.). Data that is not reliable may be discarded. If the data is discarded, the decision module 520c may apply a backup strategy. In some embodiments, the backup strategy may be to deploy the default arrangement of the corrective measures. In some embodiments, the backup strategy may be to reduce a level of autonomy of the vehicle (e.g., reduced ASIL). In one example, the backup strategy may be to revert control back to the driver. The backup strategy may be varied according to the design criteria of a particular implementation.

The decision module 520c may fuse the available data models to make evidence-based decisions. In one example, a decision made by the decision module 520c may be whether any of the corrective measures 106a-106n should be suppressed (e.g., because a seat is rotated, a child is in the seat, an object is located between the occupant and the corrective measure, etc.). In another example, a decision made by the decision module 520c may be whether any of the critical features are within the keep-out zone 212. In yet another example, a decision made by the decision module 520c may be whether any of the corrective measures should be actuated to better positions with respect to the occupants (e.g., if an occupant is too close to the dashboard the steering wheel may be pulled within the dash to create more room for air bag deployment, electronic seatbelt retraction based on the position of the occupant, pivoting/adjusting an outboard seating surface inwards to improve occupant position relative to exterior door, etc.). In still another example, a decision made by the decision module 520c may be whether an adjustment to the actuation time of the corrective measures should be made. The number and/or types of decisions made by the decision module 520c may be varied according to the design criteria of a particular implementation.

The actuation command interface 540 may be configured to generate signals based on the decision(s) by the decision module 520c. The actuation command interface 540 may convert the decisions to actuation signals compatible with the actuators 106a-106n. For example, the actuation signals may provide instructions and/or electrical signals (e.g., pulse-width modulation, voltage inputs, binary signals, etc.) to the actuators 106a-106n. The actuation signals may be used to implement when and how the corrective measure systems 106a-106n are activated, modified and/or adapted.

The apparatus 100 may be configured to adapt the use of corrective measures based on relationships between the occupants 60a-60c, objects 62a-62b and/or the available corrective measures. Advancements in assisted and autonomous driving and car-sharing strategies may be likely to influence the evolution of the possible locating and positioning of occupants and objects, beyond the default orientation (e.g., fixed and forward-facing seating). The apparatus 100 may enable inputs, processing, and/or control to provide effective corrective measures adapted for spatial-mobility within the interior 52. Use of the additional inputs (e.g., the seat rotation sensor cluster 102i and the seat recline sensor cluster 102j) with traditional and emerging corrective measures, may enable the apparatus 100 to enhance decision-making capabilities, and improve an effectiveness of the corrective measures.

The apparatus 100 may be configured to deploy the corrective measures in a default arrangement when there is a default seating and/or interior orientation (e.g., forward facing seats). The apparatus 100 may be configured to modify and/or adapt the corrective measures to alternate arrangements when there is spatial-mobility relative to the default orientations. For example, the default arrangement of the corrective measures may operate based on an assumed fixed location/orientation of the occupants. The adapted set of deployment arrangements for the corrective measures may alter the corrective measures based on changes in the spatial location/orientation of the occupants 60a-60c as well as critical feature positioning that may be detected.

The apparatus 100 may detect critical feature positioning (e.g., head position, proximity to restraint, tilt, etc.). The positioning may be detected based on a radial positioning for fore-aft view and/or an orthogonal positioning for top-down view and/or side-side view. The positioning may be relative to an origin based on a fixed point (e.g., a seat and/or other car feature) and/or a movable object (e.g., detect the object, then detect the origin (e.g., occupant center of mass) and assign the origin to the sensed point).

The apparatus 100 may determine occupants and/or objects within the zones 210aa-210nn of the interior 52 and/or determine the keep-out zone 212. The keep-out zone 212 may be defined based on the zones 210aa-210nn. The keep-out zone 212 may define where deployment of the corrective measures may do more harm than non-deployment. However, the apparatus 100 may distinguish between occupants and objects in the keep-out zone 212 (e.g., a critical feature of the occupant within the keep-out zone 212 may cause a corrective measure to be inhibited, but the object may not). The zones 210aa-210nn may further define where the corrective measures may occupy space when deployed and/or when not deployed. For example, when something is in the keep-out zone 212, the apparatus 100 may make a decision about inhibiting the corrective measures and when the keep-out zone is vacant, the apparatus 100 may enable the default arrangement of the corrective measures.

Figure 18:
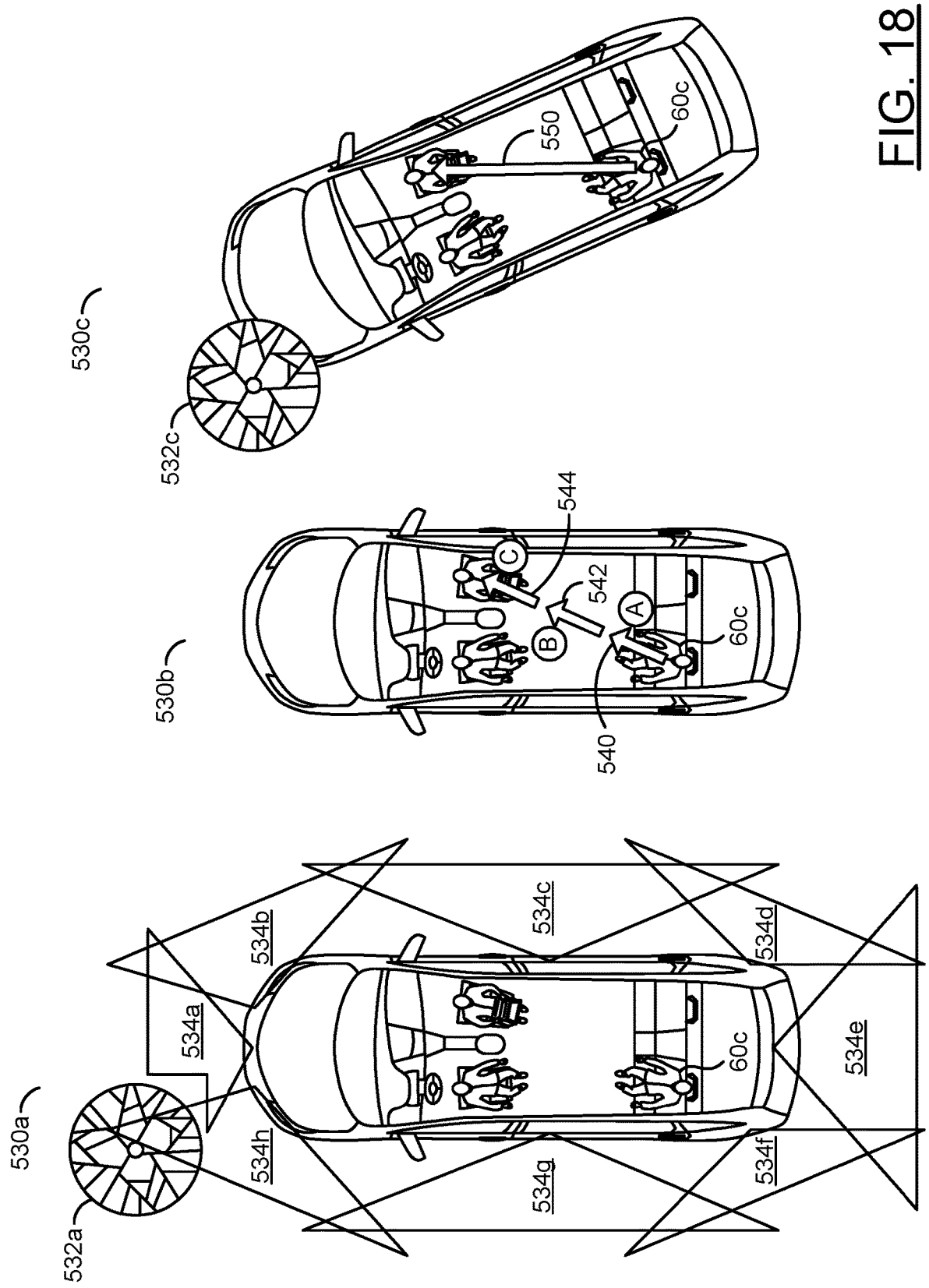
FIG. 18 is a diagram illustrating an example event and prediction.

Referring to FIG. 18, a diagram illustrating an example event and prediction is shown. Three moments in time 530a-530c are shown. In some embodiments, the moments in time 530a-530c may represent spatial/temporal estimate data. The moment in time 530a may represent a situation before the event occurs. The moment in time 530b may represent a situation predicted by the occufuse module 520b and/or the spatial/temporal estimation module 530. The moment in time 530c may represent a situation when the event occurs.

An imminent event 532a is shown in the pre-event situation estimation 530a. The imminent event 532a may be an obstacle that may connect with the vehicle 50 and/or cause a force to be applied to the vehicle 50. A number of fields of view 534a-534h are shown. The fields of view 534a-534h may represent areas about which the sensors 102a-102n may be reading data. In some embodiments, the fields of view 534a-534h may represent coverage by the camera sensor cluster 102a. Generally, the fields of view 534a-534h may provide a full 360 degree range of coverage around the vehicle 50 to enable event detection.

In the example shown, the imminent event 532a and the vehicle 50 may be approaching each other. The ECU 104a may aggregate the information received by the sensor clusters 102a-102c (e.g., shown in association with FIG. 17). For example, the imminent event 532a may be detected in the field of view 534h and/or the field of view 534a. The pre-event estimation module 502 may determine and/or predict an amount of force applied and/or a direction of contact with the imminent event 532a. In the example shown, the imminent event 532a may generate a large amount of force to the front driver side of the vehicle 50. The pre-event estimation module 502 may provide the pre-event information to the occufuse module 520b as part of the warning signal.

The occufuse estimation may be shown in the situation estimation 530b. The occupant 60c is shown detected in the interior 52. For example, the cabin mapping module 520a may receive the cabin vision information and/or the cabin configuration information and generate the mapping of the interior 52. The mapping may provide the interior information to the occufuse module 520b. The example situation 530b may be shown with respect to the occupant 60c. However, the predictive modeling of the imminent event 532a may be performed with respect to every one of the occupants 60a-60c and/or objects 62a-62b.

An arrow 540, an arrow 542 and an arrow 544 are shown in the occufuse estimation situation 530b. The arrow 540 may represent a predicted movement of the occupant 60c in response to the imminent event 532a after a first amount of time. For example, the occupant 60c may be predicted to be around the point A 15 ms after the event. The arrow 542 may represent a predicted movement of the occupant 60c in response to the imminent event 532a after a second amount of time. For example, the occupant 60c may be predicted to be around the point B 30 ms after the event. The arrow 544 may represent a predicted movement of the occupant 60c in response to the imminent event 532a after a third amount of time. For example, the occupant 60c may be predicted to be around the point C 45 ms after the event.

The occufuse module 520b and/or the spatial/temporal estimation module 530 may be configured to perform multiple predictive snapshots of the potential movement of the occupants 60a-60c. For example, the predictive snapshots may be estimations about future intervals (e.g., 15 ms from event, 30 ms from event, 45 ms from event, etc.). The decision module 520c may be configured to adjust and/or adapt a timing of deployment of the corrective measures based on the predictive snapshots. For example, if the occupant 60c may be at the location point B after 30 ms and there is a corrective measure (e.g., an air bag) at the location point B, the decision module 520c may deploy the corrective measure within 30 ms. If the deployment is not possible within 30 ms, then an alternate corrective measure may be deployed.

The event 532c is shown in the event situation estimation 530c. For example, the event situation 530c may represent what would happen to the vehicle 50 when the event 532c occurs. The event 532c is shown in contact with the vehicle 50. The contact by the event 532c may cause the vehicle 50 to change direction. For example, if the event 532c is stationary and/or unmovable, the contact with the vehicle 50 may cause the rear end passenger side of the vehicle 50 to spin outward. An arrow 550 is shown. The arrow 550 may represent a movement of the occupant 60c in response to the event 532c.

The event data module 500d may be configured to monitor the sensor clusters 102f-102h during the event. The event data module 500d may provide real-time data during the event. The real-time data may be compared with the predictive snapshots. For example, the decision module 520c may compare the real-time event data with the predictive snapshots to ensure that the actual reaction of the vehicle 50, the occupants 60a-60c and/or the objects 62a-62b correspond with what was predicted. The decision module 520c may make real-time adjustments to the corrective measures in response to the real-time event data (e.g., when the predictive snapshots do not correspond to the real-time event data).

Figure 19:
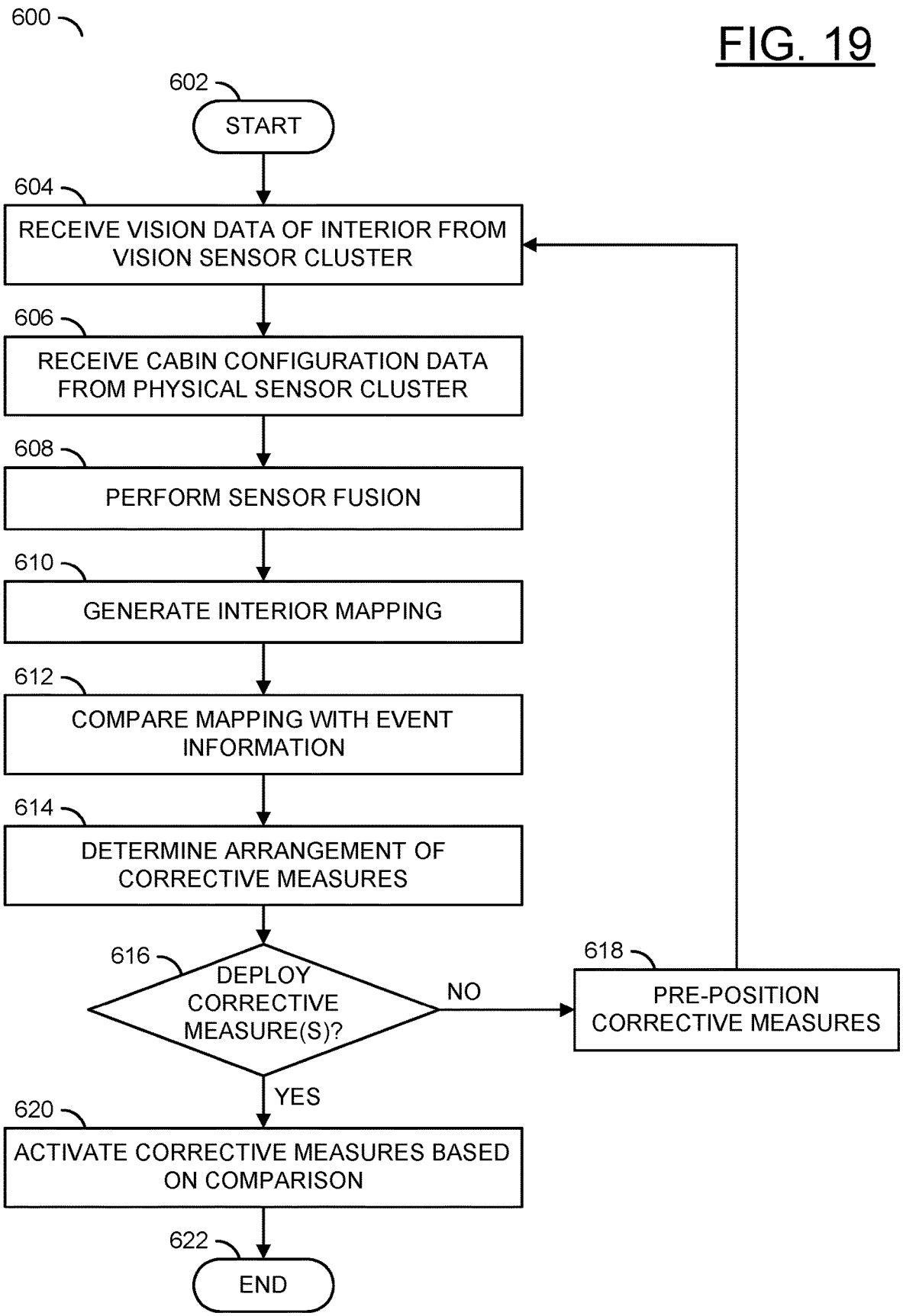
FIG. 19 is a flow diagram illustrating a method for mapping an interior of a vehicle.

Referring to FIG. 19, a method (or process) 600 is shown. The method 600 may map an interior of a vehicle. The method 600 generally comprises a step (or state) 602, a step (or state) 604, a step (or state) 606, a step (or state) 608, a step (or state) 610, a step (or state) 612, a step (or state) 614, a decision step (or state) 616, a step (or state) 618, a step (or state) 620, and a step (or state) 622.

The step 602 may start the method 600. In the step 604, the cabin mapping module 520a may receive the vision data of the interior 52 from the vision sensor cluster 102d. In the step 606, the cabin mapping module 520a may receive the cabin configuration data from the physical sensor clusters 102e, 102i and/or 102j. Next, in the step 608, the cabin mapping module 520a may perform the sensor fusion (e.g., aggregate information from disparate sources in order to make inferences). In the step 610, the cabin mapping module 520a may generate the mapping of the interior 52. Next, the method 600 may move to the step 612.

In the step 612, the occufuse module 520b may compare the mapping with the event information (e.g., received from the pre-event estimation module 502 and/or the event data module 500d). In the step 614, the decision module 520c may determine the arrangement of the corrective measures 106a-106n (e.g., location(s), status, availability, etc.). Next, the method 600 may move to the decision step 616.

In the decision step 616, the decision module 520c may determine whether to deploy the corrective measures. In not, the method 600 may move to the step 618. In the step 618, the decision module 520c may generate signals to pre-position the corrective measures 106a-106n. In an example, seat-belt pre-tensioning may be performed. In another example, the steering wheel may be pulled within the dashboard to provide more room for a driver seat air bag deployment. Next, the method 600 may return to the step 604.

In the decision step 616, if the decision module 520c determines to deploy the corrective measures, the method 600 may move to the step 620. In the step 620, the decision module 520c may activate the corrective measures based on the comparison between the mapping information and the event information. For example, the actuation command interface 540 may generate the appropriate signals to activate one or more of the corrective measure systems 106a-106n. Next, the method 600 may move to the step 622. The step 622 may end the method 600.

Figure 20:
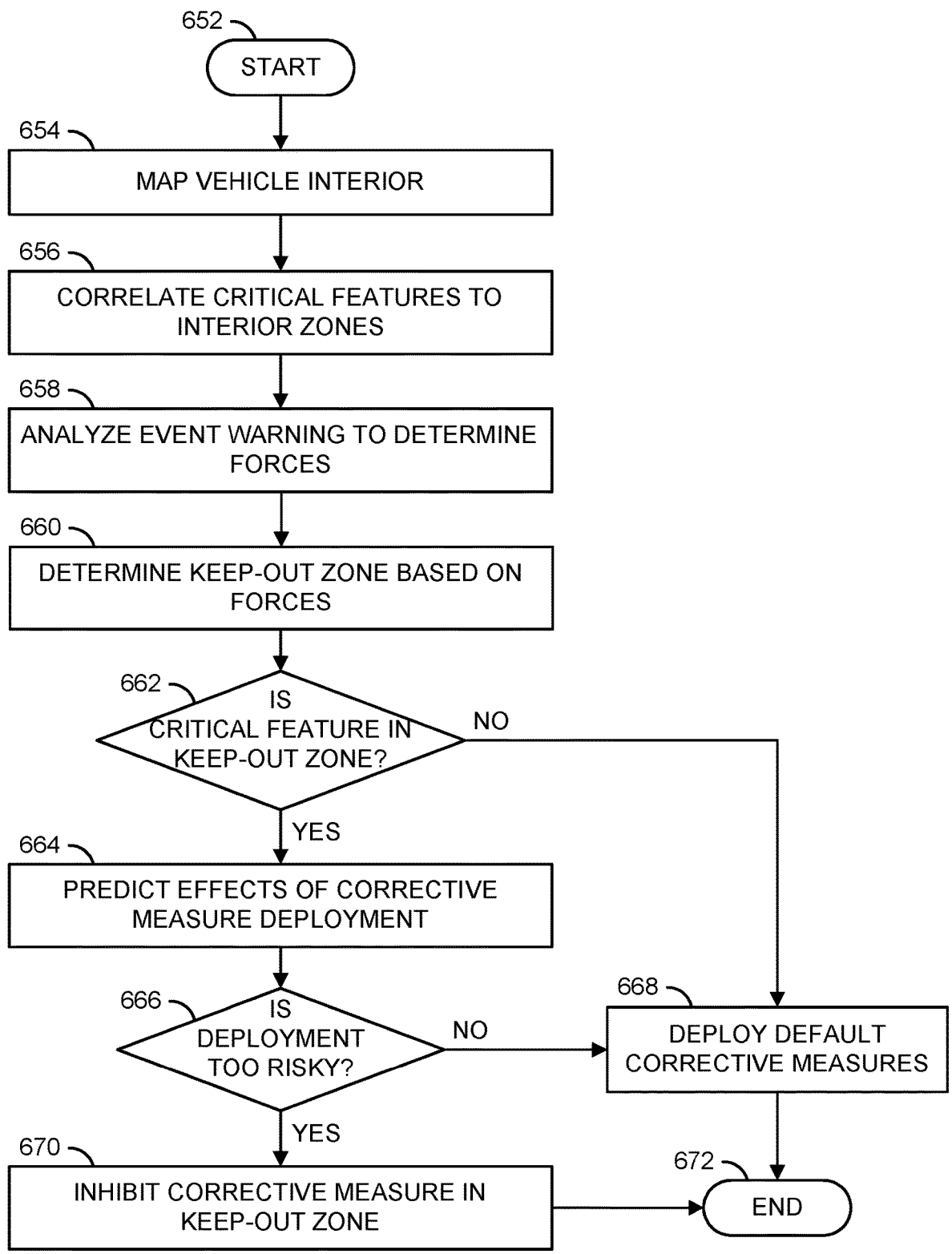
FIG. 20 is a flow diagram illustrating a method for inhibiting corrective measures in a keep-out zone.

Referring to FIG. 20, a method (or process) 650 is shown. The method 650 may inhibit corrective measures in a keep-out zone. The method 650 generally comprises a step (or state) 652, a step (or state) 654, a step (or state) 656, a step (or state) 658, a step (or state) 660, a decision step (or state) 662, a step (or state) 664, a decision step (or state) 666, a step (or state) 668, a step (or state) 670, and a step (or state) 672.

The step 652 may start the method 650. In the step 654, the cabin mapping module 520b may map the interior 52. Next, in the step 656, the occufuse module 520b may correlate the critical features of the occupants 60a-60c to the interior zones 210aa-210nn. In the step 658, the occufuse module 520b may analyze the event warning (e.g., information received from the pre-event estimation module 502 and/or the event data module 500d) to determine the forces that may be applied to the vehicle 50. Next, in the step 660, the occufuse module 520b may determine the keep-out zone 212 based on the event information and/or the cabin mapping. Next, the method 650 may move to the decision step 662.

In the decision step 662, the decision module 520c may determine whether the critical feature is in the keep-out zone 212. If the critical feature is not in the keep-out zone 212, the method 650 may move to the step 668. If the critical feature is in the keep-out zone 212, the method 650 may move to the step 664. In the step 664, the occufuse module 520b and/or the spatial/temporal estimation module 530 may predict the effects of the corrective measure deployment. Next, the method 650 may move to the decision step 666.

In the decision step 666, the decision module 520c may determine whether deployment of the corrective measure is too risky. For example, the decision module 520c may analyze the various predictive models in order to balance and/or compare potential harm caused by deployment and non-deployment of the corrective measures. If the deployment is not too risky, the method 650 may move to the step 668. In the step 668, the corrective measure systems 106a-106n may be deployed in a default arrangement. Next, the method 650 may move to the step 672. In the decision step 666, if the deployment is too risky, the method 650 may move to the step 670. In the step 670, the decision module 520c may inhibit the corrective measures 106a-106n that are in the keep-out zone(s) 212. Next, the method 650 may move to the step 672. The step 672 may end the method 650.

The functions performed by the diagrams of FIGS. 19-20 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a first sensor configured to perform a vision detection of an interior of a vehicle to determine a location of one or more occupants;
    a second sensor configured to perform a physical detection of said interior of said vehicle to determine a cabin configuration of a plurality of objects within said vehicle; and
    a control unit (i) comprising an interface configured to receive said vision detection and said physical detection and (ii) configured to (a) perform sensor fusion based on said vision detection and said physical detection, (b) generate a mapping of said interior of said vehicle based on said sensor fusion, (c) compare said mapping with event information to determine whether the one or more occupants are in a forward facing position, (d) implement corrective measures when said one or more occupants are in said forward facing position and (e) modify said corrective measures in response to said comparison of said mapping and said event information indicating at least one of said occupants is rotated from said forward facing position, wherein said corrective measures are modified to tune deployment options of said corrective measures by disabling one or more of said corrective measures.

2. The apparatus according to claim 1, wherein said vision detection comprises distinguishing between free-space and occupants within said interior of said vehicle.

3. The apparatus according to claim 1, wherein said first sensor comprises at least one of a camera, a radar device, an infrared device, a LIDAR device, a thermal imaging device, and a sonic imaging device.

4. The apparatus according to claim 3, wherein said radar device implements terahertz wave technology.

5. The apparatus according to claim 1, wherein said physical detection comprises sensing attributes of an object based on physical contact.

6. The apparatus according to claim 5, wherein said attributes comprise a presence of said object, a location of said object, a position of said object, and an angle of said object.

7. The apparatus according to claim 5, wherein said object comprises seats of said vehicle, a seatbelt, and a steering wheel.

8. The apparatus according to claim 1, wherein said second sensor performs said physical detection by measuring at least one of a pressure, a resistance, an inductance, a capacitance, and magnetics.

9. The apparatus according to claim 1, wherein said mapping of said interior of said vehicle comprises detecting said objects, occupants and critical features with respect to zones of said interior of said vehicle.

10. The apparatus according to claim 9, wherein one or more of said zones is determined to be a keep-out zone based on a location of a force applied to said vehicle.

11. The apparatus according to claim 10, wherein said corrective measures are modified if one of said objects, occupants and critical features is in said keep-out zone.

12. The apparatus according to claim 11, wherein (i) one of said corrective measures is a deployment of an air bag and (ii) said deployment of said air bag is inhibited if one of said objects, occupants and critical features is in said keep-out zone.

13. The apparatus according to claim 1, wherein:
    said modification of said corrective measures comprise using predictive positioning to estimate where said occupants will be at a future time; and
    said plurality of objects include seats configured to be rotated in a non-front facing direction.

14. The apparatus according to claim 1, wherein said modified of said corrective measures comprises deploying an air bag curtain to mitigate contact between two or more occupants.

15. An apparatus comprising:
    a first sensor configured to perform a vision detection of an interior of a vehicle to determine a location of one or more occupants;
    a second sensor configured to perform a physical detection of said interior of said vehicle to determine a cabin configuration of a plurality of objects within said vehicle; and
    a control unit (i) comprising an interface configured to receive said vision detection and said physical detection and (ii) configured to (a) perform sensor fusion based on said vision detection and said physical detection, (b) generate a mapping of said interior of said vehicle based on said sensor fusion, (c) compare said mapping with event information to determine whether the occupants are in a forward facing position, (d) implement corrective measures when at least one of said occupants is in said forward facing position and (e) modify said corrective measures in response to said comparison of said mapping and said event information indicating at least one of said occupants is rotated from said forward facing position, wherein said corrective measures are modified to deploy an air bag curtain.

16. The apparatus according to claim 15, wherein said air bag curtain is configured to mitigate contact between two or more occupants.

17. An apparatus comprising:
a first sensor configured to perform a vision detection of an interior of a vehicle to determine a location of one or more occupants;
a second sensor configured to perform a physical detection of said interior of said vehicle to determine a cabin configuration of a plurality of objects within said vehicle; and
a control unit (i) comprising an interface configured to receive said vision detection and said physical detection and (ii) configured to (a) perform sensor fusion based on said vision detection and said physical detection, (b) generate a mapping of said interior of said vehicle based on said sensor fusion, (c) compare said mapping with event information to determine whether the occupants are in an occupant zone, (d) implement corrective measures when at least one of said occupants is in said occupant zone and (e) modify said corrective measures in response to said comparison of said mapping and said event information indicating said one or more occupants are outside said occupant zone, wherein said corrective measures are modified to deploy an air bag to keep said occupants within a respective occupant zone.

18. The apparatus according to claim 17, wherein said air bag is configured to mitigate contact between two or more occupants.

19. The apparatus according to claim 17, wherein said air bag is configured to angle a front of a seat bottom upwards to mitigate slipping under a seatbelt.

20. The apparatus according to claim 17, wherein:
said first sensor and said second sensor determine a keep-out zone, and
said control unit modifies said corrective measures to inhibit deployment of said air bag when an occupant or an object is within said keep-out zone.

* * * * *